(12) United States Patent
Nakata et al.

(10) Patent No.: US 7,765,995 B2
(45) Date of Patent: Aug. 3, 2010

(54) FUEL INJECTION DEVICE AND FUEL INJECTION SYSTEM

(75) Inventors: Kenichiro Nakata, Kariya (JP); Koji Ishizuka, Chita-gun (JP)

(73) Assignee: Denso Corporation, Kariya (JP)

( * ) Notice: Subject to any disclaimer, the term of this patent is extended or adjusted under 35 U.S.C. 154(b) by 32 days.

(21) Appl. No.: 12/189,376

(22) Filed: Aug. 11, 2008

(65) Prior Publication Data
US 2009/0056676 A1 Mar. 5, 2009

(30) Foreign Application Priority Data
Aug. 31, 2007 (JP) ............................. 2007-227118

(51) Int. Cl.
*F02D 41/38* (2006.01)
*G01M 15/09* (2006.01)

(52) U.S. Cl. ...................... 123/673; 123/674; 123/490; 73/114.51

(58) Field of Classification Search ................. 123/490, 123/494, 673, 674; 73/114.51
See application file for complete search history.

(56) References Cited

U.S. PATENT DOCUMENTS

| 5,445,019 | A | * | 8/1995 | Glidewell et al. | ........ | 73/114.51 |
| 6,142,121 | A | | 11/2000 | Nishimura et al. | | |
| 6,311,669 | B1 | * | 11/2001 | Przymusinski et al. | ....... | 123/300 |
| 6,474,306 | B2 | * | 11/2002 | Muller et al. | ................ | 123/479 |
| 6,729,297 | B2 | | 5/2004 | Futonagane et al. | | |
| 6,997,164 | B2 | * | 2/2006 | Corcione et al. | ............. | 123/447 |
| 7,305,972 | B2 | * | 12/2007 | Kloos et al. | .................. | 123/479 |
| 7,363,141 | B2 | | 4/2008 | Fujii | | |
| 7,422,001 | B2 | * | 9/2008 | Kaneko | ....................... | 123/456 |
| 2006/0130569 | A1 | * | 6/2006 | Walther et al. | ............ | 73/119 A |

FOREIGN PATENT DOCUMENTS

| EP | 1 365 135 | 11/2003 |
| JP | 2001-108556 | 4/2001 |
| JP | 2002-276503 | 9/2002 |
| JP | 2006-200378 | 8/2006 |
| JP | 2007-132315 | 5/2007 |
| JP | 2009-503357 | 1/2009 |

(Continued)

OTHER PUBLICATIONS

U.S. Appl. No. 12/186,038 of Nakata, filed Aug. 5, 2008.

(Continued)

*Primary Examiner*—Erick Solis
(74) *Attorney, Agent, or Firm*—Nixon & Vanderhye P.C.

(57) ABSTRACT

A fuel injection device includes a fuel injection valve for injecting fuel, which is distributed from a pressure-accumulation vessel. A pressure sensor is located in a fuel passage, which extends from the pressure-accumulation vessel to a nozzle hole, and configured to detect pressure of the fuel. The pressure sensor is located closer to the nozzle hole than the pressure-accumulation vessel. A storage unit stores individual difference information, which indicates an injection characteristic of the fuel injection valve, the injection characteristic being obtained by an examination. The individual difference information is related to a fluctuation pattern of a portion of the fluctuation in detected pressure waveform of the pressure sensor. The fluctuation is attributed to one fuel injection through the nozzle hole. The portion of the fluctuation is subsequent to an end of the fuel injection.

19 Claims, 8 Drawing Sheets

FOREIGN PATENT DOCUMENTS

WO    WO 2007/014863    2/2007

OTHER PUBLICATIONS

U.S. Appl. No. 11/930,668 of Ishizuka, filed Oct. 31, 2007.
U.S. Appl. No. 12/179,235 of Ishizuka filed Jul. 24, 2008.
U.S. Appl. No. 12/187,638 of Nakata filed Aug. 7, 2008.
Japanese Office Action dated Jun. 16, 2009, issued in corresponding Japanese Application No. 2007-227118, with English translation.
U.S. Appl. No. 12/194,130, Kenichiro Nakata et al., filed Aug. 19, 2008.
U.S. Appl. No. 12/197,447, Kenichiro Nakata et al., filed Aug. 25, 2008.
U.S. Appl. No. 12/210,409, Koji Ishizuka et al., filed Sep. 15, 2008.
U.S. Appl. No. 12/195,609, Kenichiro Nakata et al., filed Aug. 21, 2008.
U.S. Appl. No. 12/210,440, Kenichiro Nakata et al., filed Sep. 15, 2008.
U.S. Appl. No. 12/235,917, Kenichiro Nakata et al., filed Sep. 23, 2008.
U.S. Appl. No. 12/233,800, Kenichiro Nakata et al., filed Sep. 19, 2008.
U.S. Appl. No. 12/194,917, Kenichiro Nakata et al., filed Aug. 20, 2008.
U.S. Appl. No. 12/236,882, Koji Ishizuka et al., filed Sep. 24, 2008.
U.S. Appl. No. 12/201,426, Kenichiro Nakata et al., filed Aug. 29, 2008.
U.S. Appl. No. 12/255,936, Koji Ishizuka et al., filed Oct. 22, 2008.
U.S. Appl. No. 12/256,100, Koji Ishizuka et al., filed Oct. 22, 2008.
U.S. Appl. No. 12/258,726, Koji Ishizuka et al., filed Oct. 27, 2008.
U.S. Appl. No. 12/258,750, Koji Ishizuka et al., filed Oct. 27, 2008.

* cited by examiner

FUEL INJECTION DEVICE AND FUEL INJECTION SYSTEM

CROSS REFERENCE TO RELATED APPLICATIONS

This application is based on and incorporates herein by reference Japanese Patent Application No. 2007-227118 filed on Aug. 31, 2007.

FIELD OF THE INVENTION

The present invention relates to a fuel injection device having a fuel injection valve for injecting fuel, which is distributed from a pressure-accumulation vessel. The present invention further relates to a fuel injection system having the fuel injection device.

BACKGROUND OF THE INVENTION

Conventionally, a common-rail fuel injection device includes a common rail as a pressure-accumulation vessel, which is configured to accumulate fuel at high pressure. The common rail is further configured to distribute the high-pressure fuel to fuel injection valves for injecting the distributed fuel respectively to cylinders of an internal combustion engine. Such a conventional common-rail fuel injection device in JP-A-2006-200378 includes a pressure sensor as a rail pressure sensor. The pressure sensor is mounted to the common rail for detecting pressure of fuel accumulated in the common rail. The common-rail fuel injection device is configured to control various devices such as a fuel pump for supplying fuel to the common rail based on a detection result of the pressure sensor.

The fuel injection device in JP-A-2006-200378 controls an injection quantity Q by controlling an opening period Tq of the fuel injection valve. Even in fuel injection valves of the same type, each fuel injection valve has a specific relationship between the opening period and the injection quantity, and the specific relationship has an individual difference. Therefore, the specific relationship as an injection characteristic (Tq-Q characteristic) is examined for each fuel injection valve before factory shipment thereof. The injection characteristic, which is obtained through the examination, is encoded to generate a QR Code (registered trademark), which indicates individual difference information. The QR Code is adhered to the fuel injection valve.

The QR Code, which indicates the individual difference information, is read using a scanner device. Thereafter, the individual difference information is stored in an engine ECU, which controls an operating condition of an engine. After the factory shipment of the fuel injection valve, the fuel injection valve is mounted to an engine. Thus, the engine ECU of the engine manipulates the opening period Tq based on the stored individual difference information, thereby controlling the injection quantity Q of the fuel injection valve.

However, in recent years, it is required to further control various kinds of injection states, in addition to controlling the injection quantity Q in one opening of in the fuel injection valve, which is mounted to the engine. The various kinds of injection states may include an actual injection start point, a maximum injection rate reach point, and the like in each injection. That is, even when the injection quantity Q is the same, if an injection state such as an actual injection start point and a maximum injection rate reach point is changed, the combustion state of the engine is changed. As a result, output torque of the engine and the state of exhaust air are changed. In particular, in a fuel injection device for performing a multi-stage injection in a diesel engine, it is required to control the injection state, such as actual injection start point and the maximum injection rate reach point, other than the injection quantity Q so as to control multiple fuel injections in one burning cycle.

On the contrary, in the fuel injection device according to JP-A-2006-200378, only the Tq-Q characteristic is obtained by conducting the examination, and the Tq-Q characteristic is stored as the individual difference information of the fuel injection valve. Therefore, injection states other than the injection quantity Q cannot be obtained as the individual difference. Thus, it is difficult to control the injection states other than injection quantity Q with high accuracy.

SUMMARY OF THE INVENTION

In view of the foregoing and other problems, it is an object of the present invention to produce a fuel injection device, which is capable of controlling an injection state of a fuel injection valve with high accuracy. It is another object to produce a fuel injection system having the fuel injection device.

According to one aspect of the present invention, a fuel injection device comprises a fuel injection valve for injecting fuel, which is distributed from a pressure-accumulation vessel. The fuel injection device further comprises a pressure sensor located in a fuel passage, which extends from the pressure-accumulation vessel to a nozzle hole of the fuel injection valve, and configured to detect pressure of the fuel, the pressure sensor being located closer to the nozzle hole than the pressure-accumulation vessel. The fuel injection device further comprises a storage unit for storing individual difference information, which indicates an injection characteristic of the fuel injection valve, the injection characteristic being obtained by an examination. The individual difference information is related to a fluctuation pattern of a portion of the fluctuation in detected pressure waveform of the pressure sensor, the fluctuation being attributed to one fuel injection through the nozzle hole. The portion of the fluctuation is subsequent to an end of the fuel injection.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

An embodiment embodying a fuel injection device and a fuel injection system will be described below with reference to drawings. A fuel injection device according to the present embodiment is mounted to, for example, a common-rail fuel injection system for an internal combustion engine for an automobile. For example, the present fuel injection device is used for directly injecting high-pressure fuel to a combustion chamber in a cylinder of a diesel engine. The high-pressure fuel is, for example, light oil, which is at injection pressure more than 100 MPa.

Figure 1:
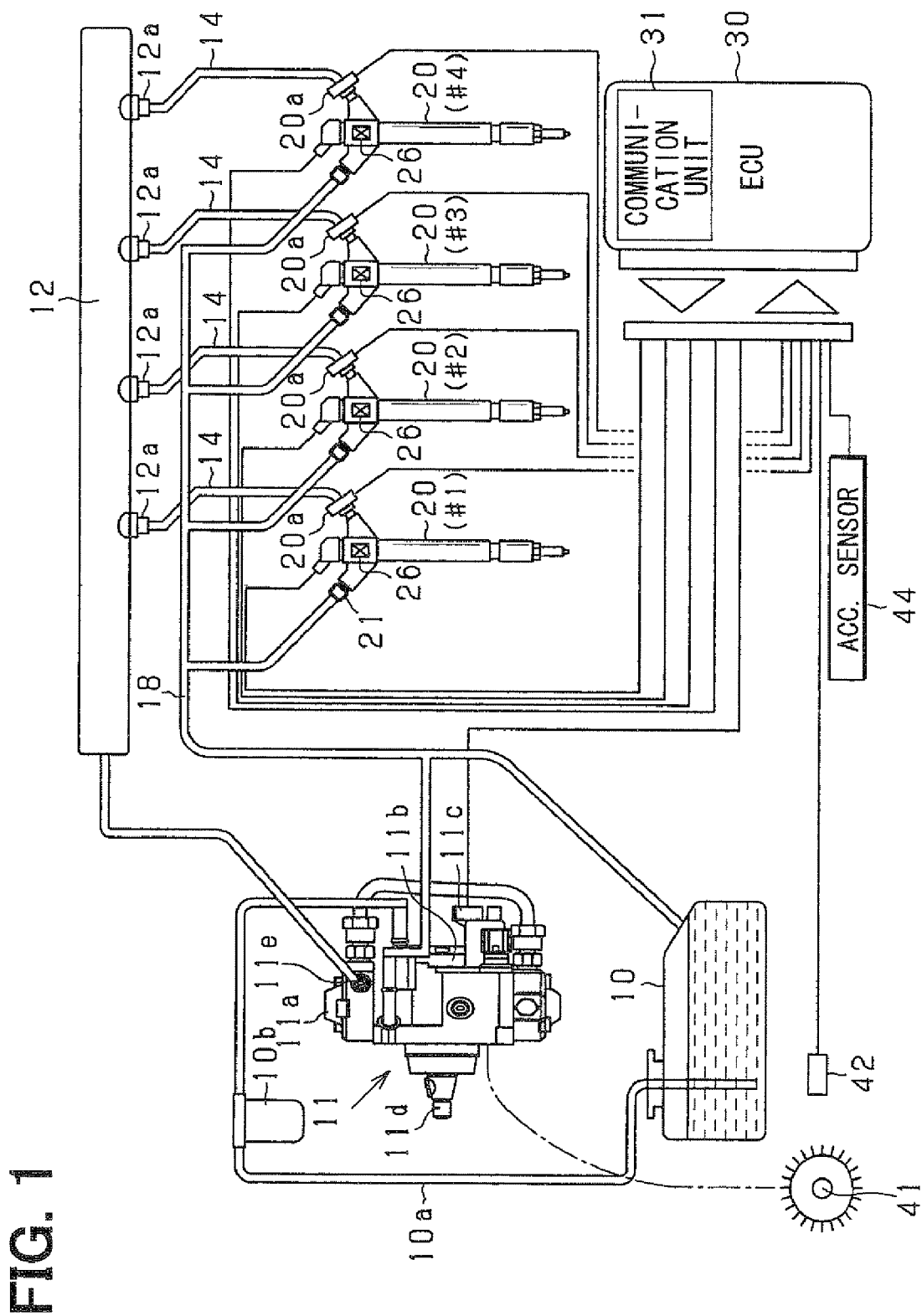
FIG. 1 is a schematic diagram showing an outline of a fuel injection device and an engine control system according to an embodiment.

First, the common-rail fuel injection system as an in-vehicle engine system according to the present embodiment is described with reference to FIG. 1. In the present embodiment, the engine is, for example, a multi-cylinder engine such as an inline four-cylinder engine. Specifically, the engine may be a four-stroke reciprocal diesel engine. In the present engine, an electromagnetic pickup as a cylinder-detection sensor is provided to a camshaft of an intake valve and an exhaust valve so as to successively determine an object cylinder at that time. Each of four cylinders #1 to #4 repeats four-stroke combustion cycles, each including an intake stroke, a compression stroke, a combustion stroke, and an exhaust stroke, at 720 degree CA (crank angle). In detail, the #1, #3, #4, #2 cylinders perform the four-stroke combustion cycle in this order at 180-degree-CA shift relative to each other. In FIG. 1, injectors 20 as fuel injection valves are respectively assigned to the cylinders #1, #2, #3, #4 from the side of a fuel tank 10.

As shown in FIG. 1, the present fuel injection system includes an electronic control unit (ECU) 30, which is configured to input detection signals, which are outputted from various sensors, and control components of a fuel supply system in accordance with the detection signals. The ECU 30 controls an electric current, which is supplied to a suction control valve 11c, thereby controlling an amount of fuel discharged from a fuel pump 11. The ECU 30 performs a feedback control such as PID control to regulate fuel pressure in a common rail 12 as a pressure-accumulation vessel at target fuel pressure. The pressure in the common rail 12 is detected using a pressure sensor 20a. The ECU 30 controls an amount of fuel injected into a specific cylinder of the engine based on the fuel pressure, thereby controlling rotation speed and torque of an output shaft of the engine.

The fuel tank 10, the fuel pump 11, the common rail 12, and the injectors 20 are arranged in this order from the upstream in the fuel supply system. The fuel tank 10 is connected with the fuel pump 11 through a fuel filter 10b and a pipe 10a.

The fuel tank 10 as a vessel is for storing fuel such as light oil for the engine. The fuel pump 11 includes a high-pressure pump 11a and a low-pressure pump 11b. The low-pressure pump 11b is configured to pump fuel from the fuel tank 10, and the high-pressure pump 11a is configured to further pressurize the fuel pumped from the low-pressure pump 11b.

A suction control valve (SCV) 11c is provided in an inlet of the fuel pump 11 to control an amount of fuel fed to the high-pressure pump 11a. In the present structure, the suction control valve 11c controls an amount of fuel discharged from the fuel pump 11. The suction control valve 11c is, for example, a normally-on regulating valve, which opens when being de-energized. In the present structure, an amount of fuel discharged from the fuel pump 11 can be regulated by controlling a drive current supplied to the suction control valve 11c so as to manipulate a valve-opening area of the suction control valve 11c.

The low-pressure pump 11b of the fuel pump 11 is, for example a trochoid feed pump. The high-pressure pump 11a is, for example, a plunger pump, which is configured to feed fuel from compression chambers by axially moving plungers successively at predetermined intervals by using an eccentric cam (not shown). The plungers may include three plungers, for example. The pumps are driven by using a driving shaft 11d. The driving shaft 11d is interlocked with a crankshaft 41, which is an output shaft of the engine. The driving shaft 11d is configured to rotate at a ratio such as one-to-one or one-to-two with respect to one rotation of the crankshaft 41, for example. In the present structure, the low-pressure pump 11b and the high-pressure pump 11a are driven by the output power of the engine.

The fuel pump 11 pumps fuel from the fuel tank 10 through the fuel filter 10b and press-feeds the pumped fuel to the common rail 12. The common rail 12 stores the fuel, which is fed from the fuel pump 11, at high pressure. The common rail 12 distributes the accumulated fuel to the injector 20 of each of the cylinders #1 to #4 through a high-pressure pipe 14, which is provided to each cylinder. Each of the injectors 20(#1) to 20(#4) has an exhaust port 21, which is connected with a pipe 18 for returning excessive fuel to the fuel tank 10. An orifice 12a as a pulsation reducing unit is provided to a connection between the common rail 12 and the high-pressure pipe 14 for attenuating pulsation in pressure of fuel, which flows from the common rail 12 into the high-pressure pipe 14.

Figure 2:
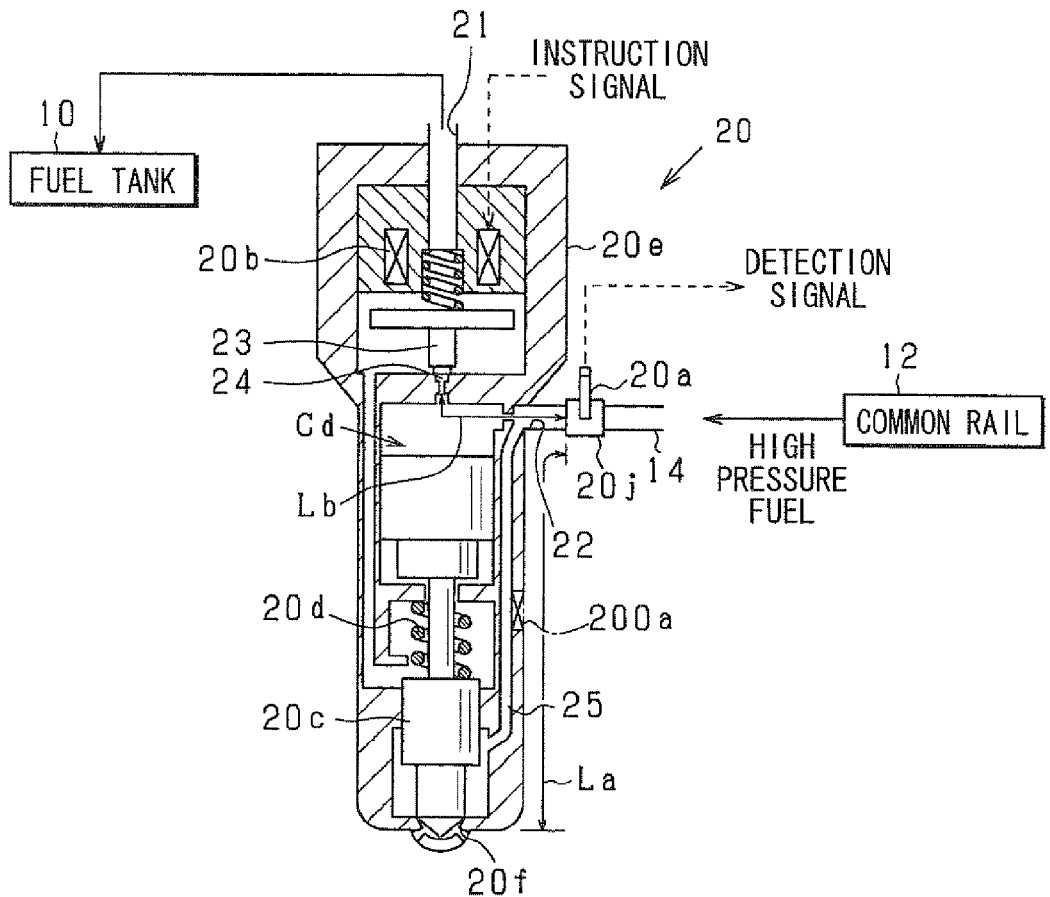
FIG. 2 is a schematic sectional view showing an internal structure of a fuel injection valve employed in the engine control system.

FIG. 2 shows a detailed structure of the injector 20. The four injectors 20(#1) to 20(#4) substantially has the same structure, which is, for example, the structure shown in FIG. 2. Each injector 20 is a fuel injection valve, which is hydraulically actuated using fuel, which is drawn from the fuel tank 10 and to be burned in the engine. In the injector 20, driving power for fuel injection is transmitted via a hydraulic pressure chamber Cd as a control chamber. As shown in the FIG. 2, the injector 20 is configured as the normally-close fuel injection valve, which is in a closed state when being de-energized.

High-pressure fuel is supplied from the common rail 12, and the High-pressure fuel flows into a fuel inlet hole 22, which is provided in a housing 20e of the injector 20. The supplied high-pressure fuel partially flows into the hydraulic pressure chamber Cd, and remaining high-pressure fuel flows to nozzle holes 20f. The hydraulic pressure chamber Cd has a leak hole 24, which is opened and closed by a control valve 23. When the leak hole 24 is opened by lifting the control valve 23, fuel is returned from the hydraulic pressure chamber Cd to the fuel tank 10 through the leak hole 24 and the exhaust port 21.

In the fuel injection of the injector 20, the control valve 23 is operated according to the energization and de-energization of a solenoid 20b, which is a two-way solenoid valve, whereby the control valve 23 controls leakage of fuel from the hydraulic pressure chamber Cd. Thus, the control valve 23 controls pressure in the hydraulic pressure chamber Cd. Here, the pressure in the hydraulic pressure chamber Cd is equivalent to backpressure applied to a needle valve 20c. Thus, the needle valve 20c reciprocates upward and downward inside the housing 20e according to the change in pressure in the hydraulic pressure chamber Cd, while being applied with biasing force of a coil spring 20d. In the present operation, a fuel passage 25, which extends to the nozzle holes 20f, is opened and closed midway therethrough. Specifically, the fuel passage 25 has a tapered seat surface, and the needle valve 20c is seated to and lifted from the tapered seat surface in accordance with the reciprocation of the needle valve 20c, whereby the needle valve 20c communicates and blockades the fuel passage 25. The number of the nozzle holes 20f may be arbitrary determined.

The needle valve 20c is, for example, on-off controlled. Specifically, the needle valve 20c has the two-way solenoid valve as the actuator, which is applied with a pulse signal as an energization signal. The pulse signal as an ON-OFF signal is transmitted from the ECU 30 to energize and de-energize the solenoid valve. The needle valve 20c is lifted by turning on the pulse signal, thereby opening the nozzle holes 20f. The needle valve 20c is seated by turning off the pulse signal, thereby blockading the nozzle holes 20f.

The pressure in the hydraulic pressure chamber Cd is increased by supplying fuel from the common rail 12. On the other hand, the pressure in the hydraulic pressure chamber Cd is decreased by energizing the solenoid 20b to manipulate the control valve 23 so as to open the leak hole 24. In the present structure, fuel is returned from the hydraulic pressure chamber Cd to the fuel tank 10 through the pipe 18 (FIG. 1), which connects the injector 20 with the fuel tank 10. That is, the fuel pressure in the hydraulic pressure chamber Cd is controlled by manipulating the control valve 23, so that the needle valve 20c is operated for opening and closing the nozzle holes 20f.

In the present structure, the injector 20 includes the needle valve 20c, which is configured to open and close the injector 20 by opening and closing the fuel passage 25, which extends to the nozzle holes 20f, in conjunction with the predetermined axial reciprocation inside the housing 20e as the valve body. When the solenoid is de-energized, the needle valve 20c is displaced to a close side by being applied with the biasing force of the spring 20d, which is regularly exerted toward the close side. When the solenoid is energized, the needle valve 20c is displaced to an open side by being applied with the driving force against the biasing force of the spring 20d. The lift of the needle valve 20c when being energized is substantially symmetric with the lift of the needle valve 20c when being de-energized.

Figure 4:
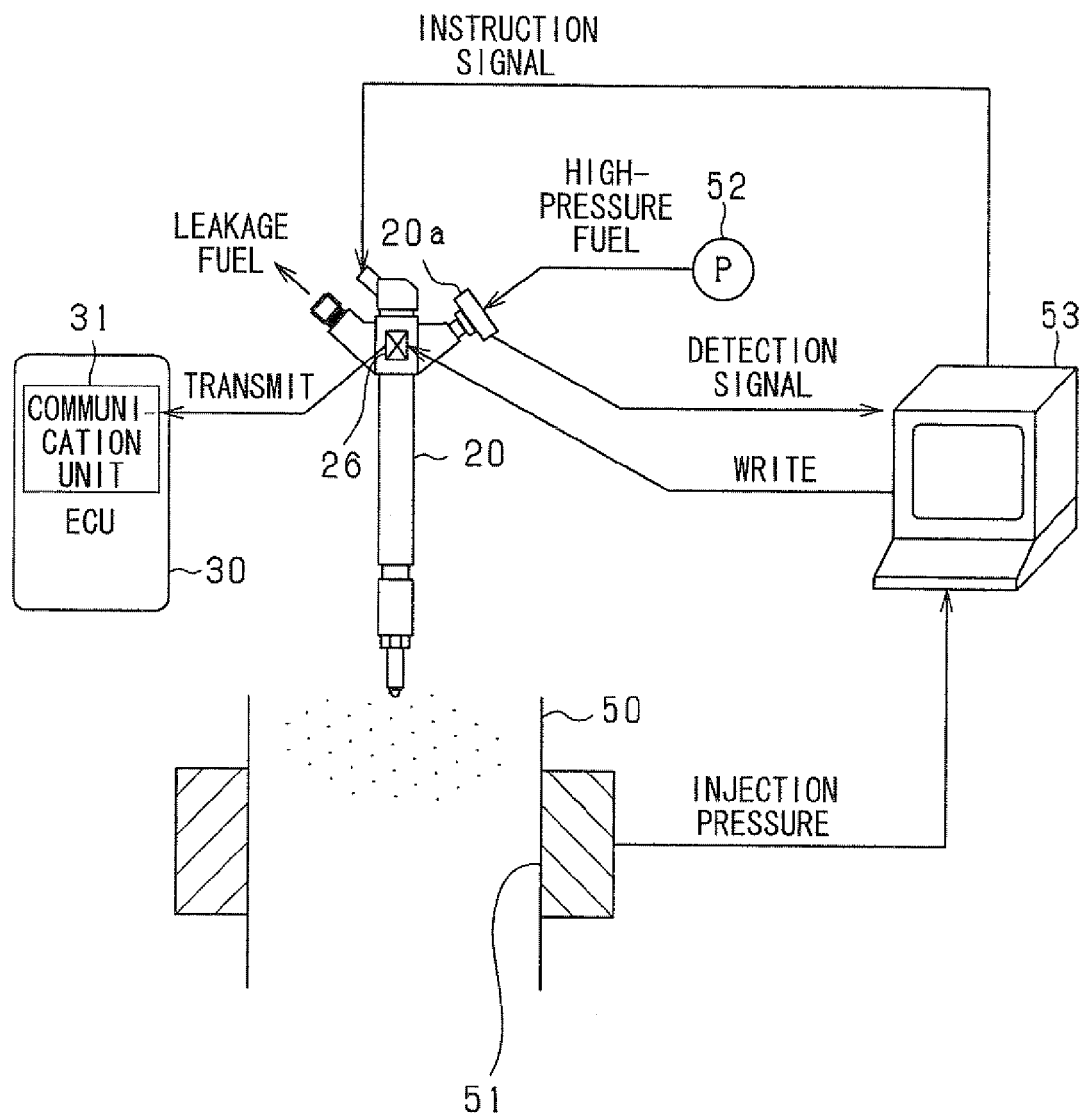
FIG. 4 is a schematic diagram showing a system for examination of an injection characteristic according to the embodiment.

The injector 20 is provided with a pressure sensor 20a (FIG. 1) for detecting fuel pressure. Specifically, the inlet hole 22 of the housing 20e is connected with the high-pressure pipe 14 via a jig 20j. The pressure sensor 20a is attached to the jig 20j. Here, in a stage where the injector 20 is shipped from a factory, the injector 20 is attached with the Jig 20j, the pressure sensor 20a, and an IC memory 26 (FIGS. 1, 4).

Thus, the fuel pressure as inlet pressure in the fuel inlet hole 22 can be arbitrary detected by the pressure sensor 20a, which is mounted to the fuel inlet hole 22 of the injector 20. Specifically, a fluctuation pattern of the fuel pressure attributed to fuel injection of the injector 20, a fuel pressure level (stable pressure), fuel injection pressure, and the like can be detected in accordance with the output of the pressure sensor 20a.

The pressure sensor 20a is provided to each of the injectors 20(#1) to 20(#4). In the present structure, the fluctuation pattern of the fuel pressure attributed to specific fuel injection of the injector 20 can be accurately detected based on the output of the pressure sensor 20a.

In addition, various kinds of sensors for a vehicle control other than the above-mentioned sensors are provided in a vehicle such as a four-wheel automobile or a track (not shown). For example, a crank angle sensor 42 such as an electromagnetic pick up is provided to the outer periphery of the crankshaft 41, which is an output shaft of the engine. The crank angle sensor 42 is configured to detect the rotation angle and the rotation speed of the crankshaft 41, which corresponds to the engine rotation speed. The crank angle sensor 42 is configured to output a crank angle signal at predetermined intervals such 30 degree-CA. An accelerator sensor 44 is provided to detect a manipulation, which corresponds to depression of an accelerator by a driver. The accelerator sensor 44 is configured to output an electric signal according to a state, which corresponds to the position of the accelerator.

The ECU 30 predominantly performs an engine control as a fuel injection device in the present system. The ECU 30 as an engine control ECU includes a generally-known microcomputer (not shown). The ECU 30 determines an operating state of the engine and an occupant's demand on the basis of the detection signals of the various sensors, thereby operating various actuators such as the suction control valve 11c and the injector 20 in response to the operating state and the occupant's demand. Thus, the ECU 30 performs various controls relating to the engine in optimal modes adaptively to the various conditions.

The microcomputer of the ECU 30 includes a CPU as a main processing unit, which performs various kinds of operations, a RAM as a main memory, which stores temporarily data, an operation result, and the like, a ROM as a program memory, an EEPROM as a data storage, a backup RAM, and the like. The backup RAM is a memory, which is regularly supplied with electric power from a backup power supply such as an in-vehicle battery even when the main power supply of the ECU 30 is terminated. Various programs and control data maps relating to the fuel injection are stored in advance in the ROM and various control data including the design data of the engine are stored in the data storage memory such as the EEPROM.

In the present embodiment, the ECU 30 calculates demand torque, which is required to the crankshaft 41 as the output shaft, and fuel injection quantity for satisfying the demand torque, based on various kinds of sensor outputs as the detection signals, which are arbitrary inputted. In the present structure, the ECU 30 variably sets the fuel injection quantity of the injector 20, thereby controlling engine torque, which is generated through fuel combustion in the combustion chamber of each cylinder. Thus, the ECU 30 controls axial torque as output torque, which is actually outputted to the crankshaft 41, at the demand torque.

That is, the ECU 30 calculates, for example, the fuel injection quantity according to the engine operation state and manipulation of the accelerator by the driver, and the like at the time. The ECU 30 outputs the injection control signal (drive quantity) to the injector 20 so as to direct to inject fuel correspondingly to the fuel injection quantity at a predetermined injection timing. In the present operation, the output torque of the engine is controlled at a target value based on the drive quantity, which is, for example, an opening period of the injector 20.

As generally known, in a diesel engine, an intake throttle valve (throttle valve), which is provided in an intake passage of the engine, is held at a substantially full open state in a steady operation so as to further draw fresh air and to reduce pumping loss. Therefore, the fuel injection quantity is mainly manipulated for controlling a combustion state at the time of the steady operation. In particular, a combustion control related to a torque adjustment is mainly performed at the time of the steady operation.

Figure 3:
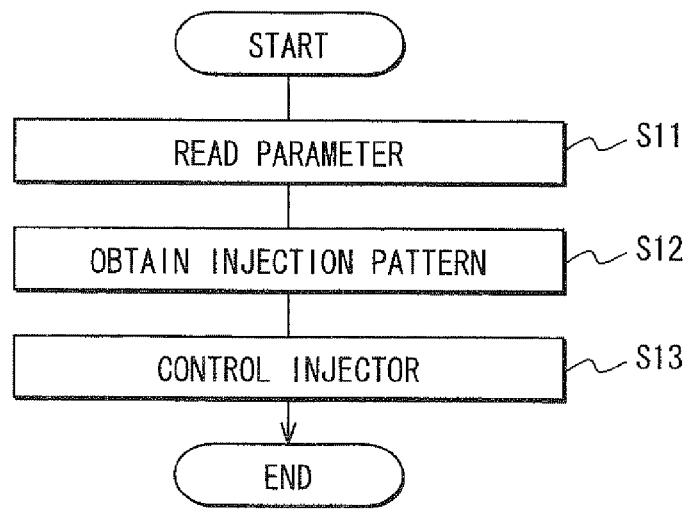
FIG. 3 is a flow chart showing an injection control according to the embodiment.

As follows, the fuel injection control according to the present embodiment is described with reference to FIG. 3. In this regard, the values of various parameters used in the processing shown in FIG. 3 are sequentially stored in the storage device, and are sequentially updated as needed. The storage device may be the RAM and the EEPROM mounted in the ECU 30, or the backup RAM. Basically, the series of processings in FIG. 3 is performed once per one burning cycle of for each cylinder of the engine. The processings in FIG. 3 is performed by executing the program stored in the ROM of the ECU 30. That is, by executing the present program, fuel supply to all the cylinders excluding an inactive cylinder is performed in a one burning cycle.

In the series of the present processing shown in FIG. 3, at step S11, predetermined parameters are read. The predetermined parameters may include the engine speed, the fuel pressure, an accelerator manipulation of the driver, and the like at that time. The engine speed may be obtained based on an actual measurement of the crank angle sensor 42. The fuel pressure may be obtained based on an actual measurement of the pressure sensor 20a. The accelerator manipulation may be obtained from an actual measurement of the accelerator sensor 44.

At subsequent step S12, an injection pattern is set up based on the various parameters, which are read at step S11. The injection patterns are variably determined according to the demand torque of the crankshaft 41, which is equivalent to the engine load at that time. For example, in a single-stage injection, the injection quantity (injection period) of the single-stage injection is variably determined as the injection pattern. Alternatively, in a multi-stage injection, the total injection quantity (the total injection period) of injections, which contribute to the engine torque, is variably determined as the injection pattern. Thus, a command value as an instruction signal for the injector 20 is set up based on the injection pattern. In the present structure, a pilot injection, a pre-injection, an after-injection, a post-injection, and the like are suitably performed with main injection according to the condition of the vehicle and the like.

The present injection pattern is obtained based on a predetermined data map such as a data map for the injection control and a correction coefficient stored in the ROM, for example. The predetermined data map may be substituted to an equation. Specifically, for example, an optimal injection pattern (conformed value) may be beforehand obtained in an assumed range of the predetermined parameter (step S11) by conducting an experiment. The obtained optimal injection pattern may be stored in the data map for the injection control. The present injection pattern is defined by parameters, such as an injection stage, the injection timing of each injection, and the injection period, for example. The injection stage is a number of injections in one burning cycle. The injection period is equivalent to the injection quantity. In this way, the injection control map indicates the relationship between the parameters and the optimal injection pattern.

The injection pattern is obtained from the injection control map and is corrected using a correction coefficient. For example, the target value is calculated by diving the value on the injection control map by the correction coefficient. Thus, the injection pattern at the time and an instruction signal, which corresponds to the injection pattern and is to be outputted to the injector 20, is obtained. The correction coefficient is stored in, for example, the EEPROM of the ECU 30 and separately updated. The correction coefficient (strictly, predetermined coefficient multiple coefficients) is successively updated by a separate processing in an operation of the engine.

In the setting of the injection pattern at step S12, data maps may be respectively created separately for the injection patterns, each including identical elements such as the injection stage. Alternatively, a data map may be created for the injection pattern, which includes some of or all the elements.

The injection pattern, which is set in this way, and the command value as the instruction signal, which corresponds to the injection pattern, are used at subsequent step S13. Specifically, at step S13, the injector 20 is controlled based on the command value as the instruction signal. In particular, the injector 20 is controlled according to the instruction signal outputted to the injector 20. The series of processings in FIG. 3 is terminated after performing the control of the present injector 20.

Next, a creation procedure of the injection control map, which is used at step S12, is described.

The present injection control map is created based on an examination result, which is conducted before shipment of the injector 20 from the factory. First, the examination as an injection characteristic examination is performed for each of the injectors 20(#1) to 20(#4). Thereafter, individual difference information, which is obtained by the examination, is stored in the IC memory 26 as a storage unit (memory unit). The individual difference information indicates the injection characteristic of each injector 20. Then, the individual difference information is transmitted from each IC memory 26 to the ECU 30 through a communication unit 31 (FIGS. 1, 4), which is provided to the ECU 30. The transmission may be a non-contact wireless transmission or a wired transmission.

The injection characteristic examination is conducted in a mode shown in FIG. 4. First, the tip end of the injector 20 is put in a vessel 50. Then, high-pressure fuel is supplied to the fuel inlet hole 22 of the injector 20, whereby fuel is injected from the nozzle holes 20f into the vessel 50. At the present examination, the high-pressure fuel may be supplied using the fuel pump 11 shown in an FIG. 1. Alternatively, as shown in FIG. 4, the high-pressure fuel may be supplied using a fuel pump 52, which is exclusively provided for the examination. The high-pressure pipe 14 and the common rail 12, which are shown in FIG. 1, need not be connected to the pressure sensor 20a, which is mounted to the injector 20. The pressure sensor 20a may be directly supplied with high-pressure fuel from the fuel pump 11 or the fuel pump 52, which is provided for the examination.

The inner periphery of the vessel 50 is provided with a strain gauge 51. The strain gauge 51 detects pressure change, which is caused by a test injection, and outputs its detection result to a measuring instrument 53. The measuring instrument 53 includes a control unit, which is configured with a microcomputer, and the like. The control portion of the measuring instrument 53 calculates the injection rate of fuel injected from injector 20 based on the detection result of the strain gauge 51, the detection result indicating the injection pressure. As shown in FIG. 4, the measuring instrument 53 outputs the instruction signal, and the solenoid 20b of the injector 20 inputs the instruction signal. The measuring instrument 53 inputs the detection result of the pressure sensor 20a as the detected pressure.

Instead of calculating the change in injection rate based on the injection pressure, which is detected by using the strain gauge 51, the change in injection rate may be estimated from contents of the injection instruction. In this case, the strain gauge 51 can be omitted.

Figure 5:
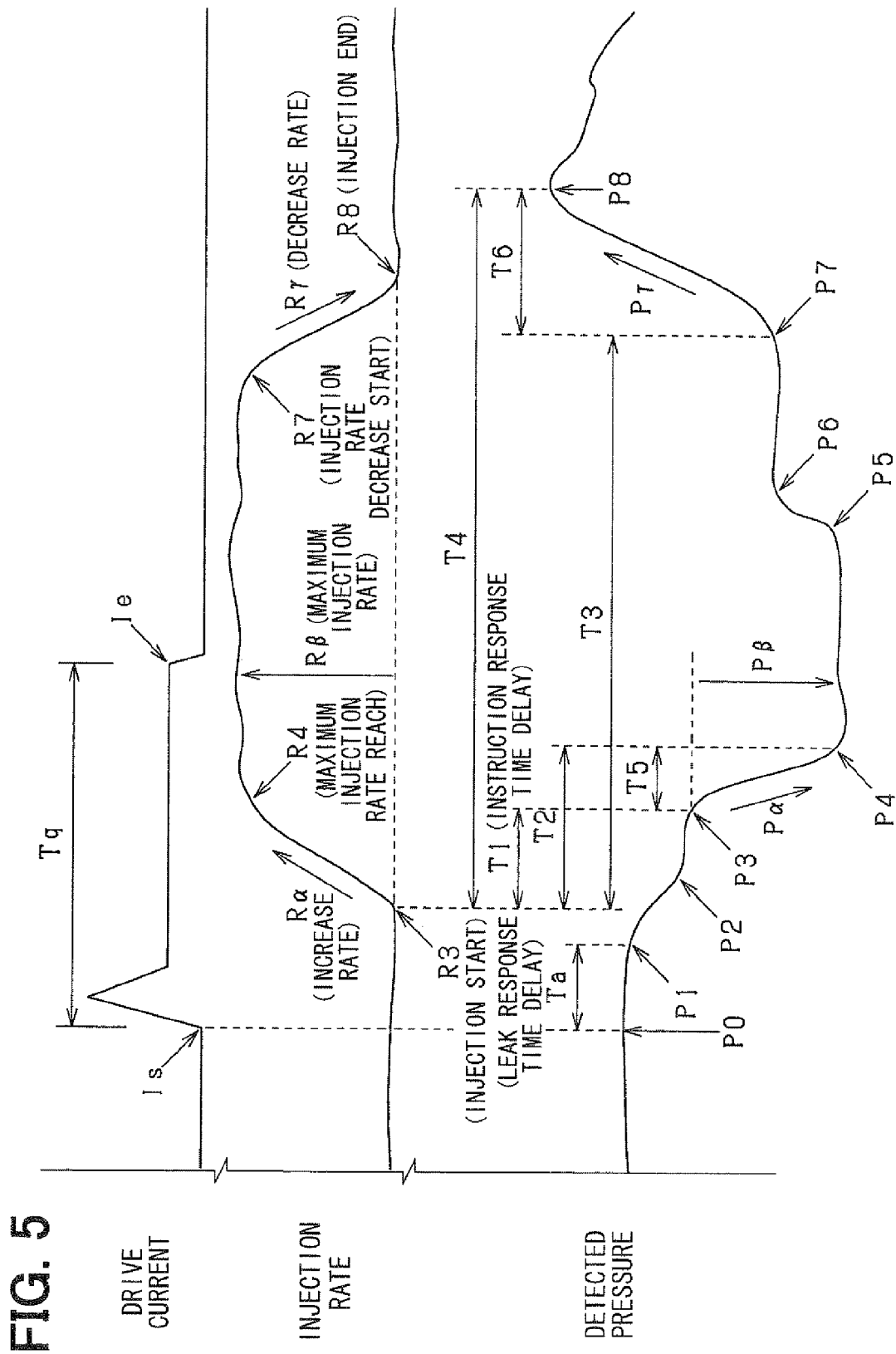
FIG. 5 is a timing chart showing the injection characteristic according to the embodiment.

FIG. 5 shows a time chart showing changes in drive current, changes in injection rate, and changes in detected pressure through the examination. The top chart from the upper side in FIG. 5 shows the driving current as the instruction signal transmitted to the solenoid 20b. The second chart in FIG. 5 shows the injection rate. The bottom chart in FIG. 5 shows the detected pressure of the pressure sensor 20a. The present examination result is obtained by once opening and closing operation of the nozzle holes 20f.

In the present embodiment, such an examination is performed in each of multiple examination conditions where the pressure P0 of fuel supplied to the fuel inlet hole 22 at the time point before the P1, is changed. The examinations are performed in the multiple examination conditions, because variation in injection characteristic is not determined uniquely in dependence upon the individual difference of injector 20. Specifically, the variation in injection characteristic also changes in dependence upon fueling pressure in the common rail 12. Therefore, in the present embodiment, by using the actual measurement result in the multiple examination conditions, in which the fueling pressure is variously modified, the variation in injection characteristic caused in dependence upon the individual difference is compensated, in addition to consideration of influence caused by the fueling pressure.

As follows, change in injection rate is described with reference to the second chart in FIG. 5B. First, energization of the solenoid 20b is started at the time point (energization start time point) Is, thereafter fuel injection from the nozzle holes 20f is started at the transition point R3. Thus, the injection rate starts increasing at the transition point R3. That is, actual fuel injection is started. Then, the injection rate reaches at the maximum injection rate at the transition point R4, where the injection rate stops increasing. The needle valve 20c starts being lifted at the time of R3 and reaches the maximum lift at the transition point R4, and hence the injection rate stops increasing at the transition point R4.

In the present specification, the transition point is defined as follows. A second-order derivative of the injection rate or a second-order derivative of the detected result of the pressure sensor 20a is first calculated. The extremum at the point where the change is the maximum in a waveform, which indicates the second-order derivative, is the transition point of the waveform of the injection rate or the detected pressure. That is, the inflection point of the waveform of the second-order derivative is the transition point.

Subsequently, energization of the solenoid 20b is terminated at the time point Ie, thereafter the injection rate starts decreasing at the transition point R7. Then, the injection rate becomes zero at the transition point R8, where the actual fuel injection is terminated. The needle valve 20c starts being seated at the time of R7, and the needle valve 20c is completely seated at the transition point R8. Hence, the nozzle holes 20f are closed and the actual fuel injection is terminated at the transition point R8.

Next, change in detected pressure of the pressure sensor 20a is described with reference to the bottom chart in FIG. 5. The pressure P0, which is before the transition point P1, is the fueling pressure defined as an examination condition. The solenoid 20b is first supplied with the driving current. Thereafter, the detected pressure decrease at the transition point P1 before the injection rate starts increasing at the time point R3. It is caused because the control valve 23 opens the leak hole 24 at the time point P1, whereby the hydraulic pressure chamber Cd is decompressed. Then, when the hydraulic pressure chamber Cd is sufficiently decompressed, the detected pressure, which is decreasing from the P1, once stops decreasing at the transition point P2.

Subsequently, the detected pressure starts decreasing at the transition point P3, since the injection rate starts increasing at the time point R3. Subsequently, the decrease in the detected pressure stops at the transition point P4, since the injection rate reaches the maximum injection rate at the time point R4. Here, the decrease in detected pressure between the transition points P3 and P4 is larger than the decrease in detected pressure between the transition points P1 and P2.

Subsequently, the detected pressure increases at the transition point P5. It is caused because the control valve 23 closes the leak hole 24 at the time of P5, whereby the hydraulic pressure chamber Cd is pressurized. Then, when the hydraulic pressure chamber Cd is sufficiently pressurized, the detected pressure, which is increasing from the transition point P5, once stops increasing at the transition point P6.

Figure 8:
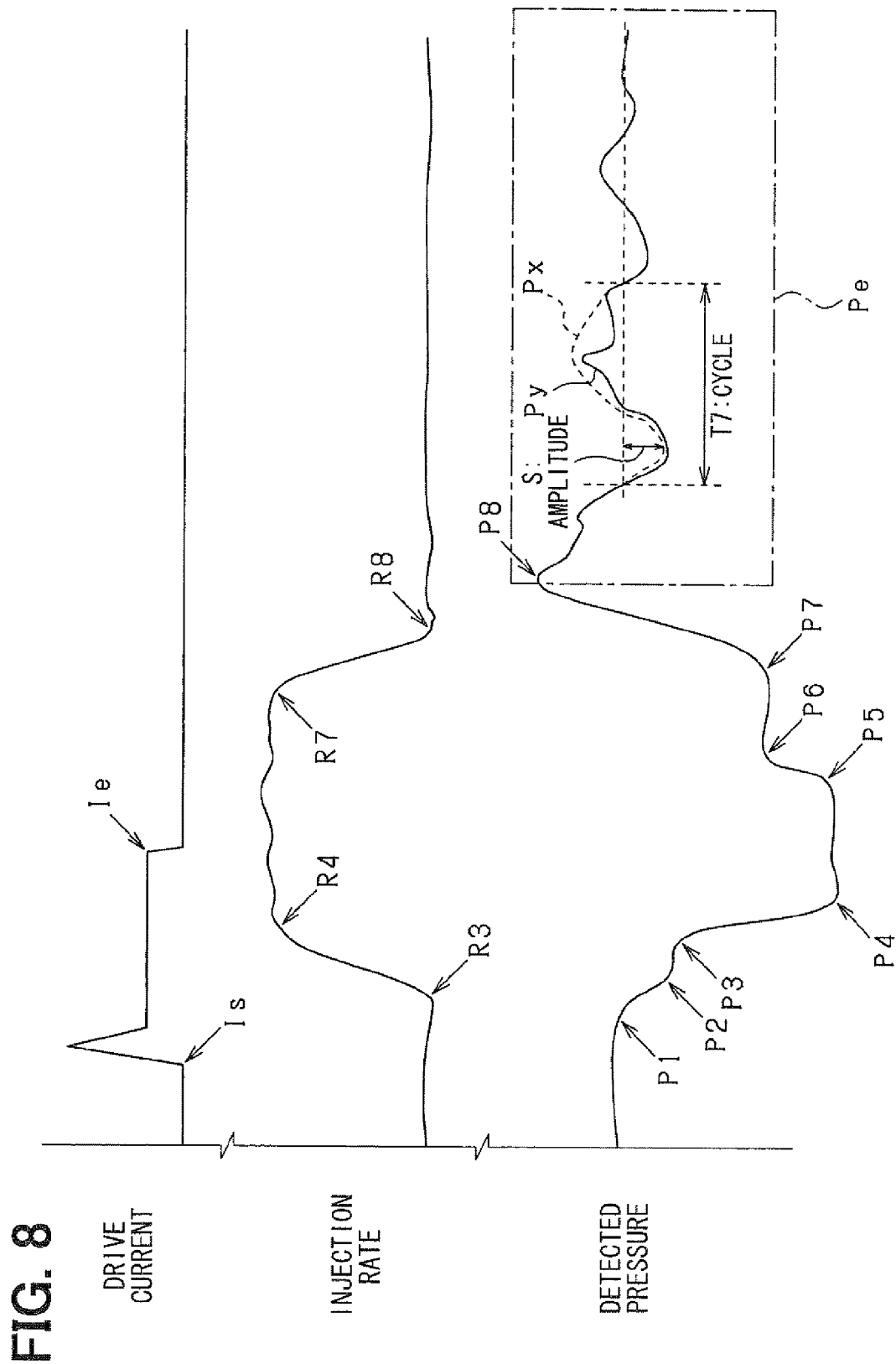
FIG. 8 is a timing chart showing the injection characteristic according to the embodiment.

Subsequently, the detected pressure starts increasing at the transition point P7, since the injection rate starts decreasing at the time point R7. Subsequently, the increase in detected pressure stops at the transition point P8, since the injection rate reaches zero at the time point R8, and actual fuel injection stops at the time point R8. Here, the increase in detected pressure between the transition points P7 and P8 is larger than the increase in detected pressure between the transition points P5 and P6. As shown in FIG. 8, the detected pressure subsequent to P8 decreases while repeating decreasing and increasing at a constant cycle T7 (FIG. 8).

In creating of the injection control map, individual difference information A1 to A7, B1, B2, and C1 to C3 (mentioned later) are first calculated based on the injection characteristic obtained from the examination result shown in FIG. 5. The obtained injection characteristic includes the change in detected pressure and the change in injection rate shown in FIG. 5. The calculated various individual difference information is stored in the IC memory 26. Then, the individual difference information stored in the IC memory 26 is transmitted to the ECU 30. The ECU 30 creates or modifies the injection control map based on the transmitted individual difference information.

<Individual Difference Information A1 to A7>

Figure 6:
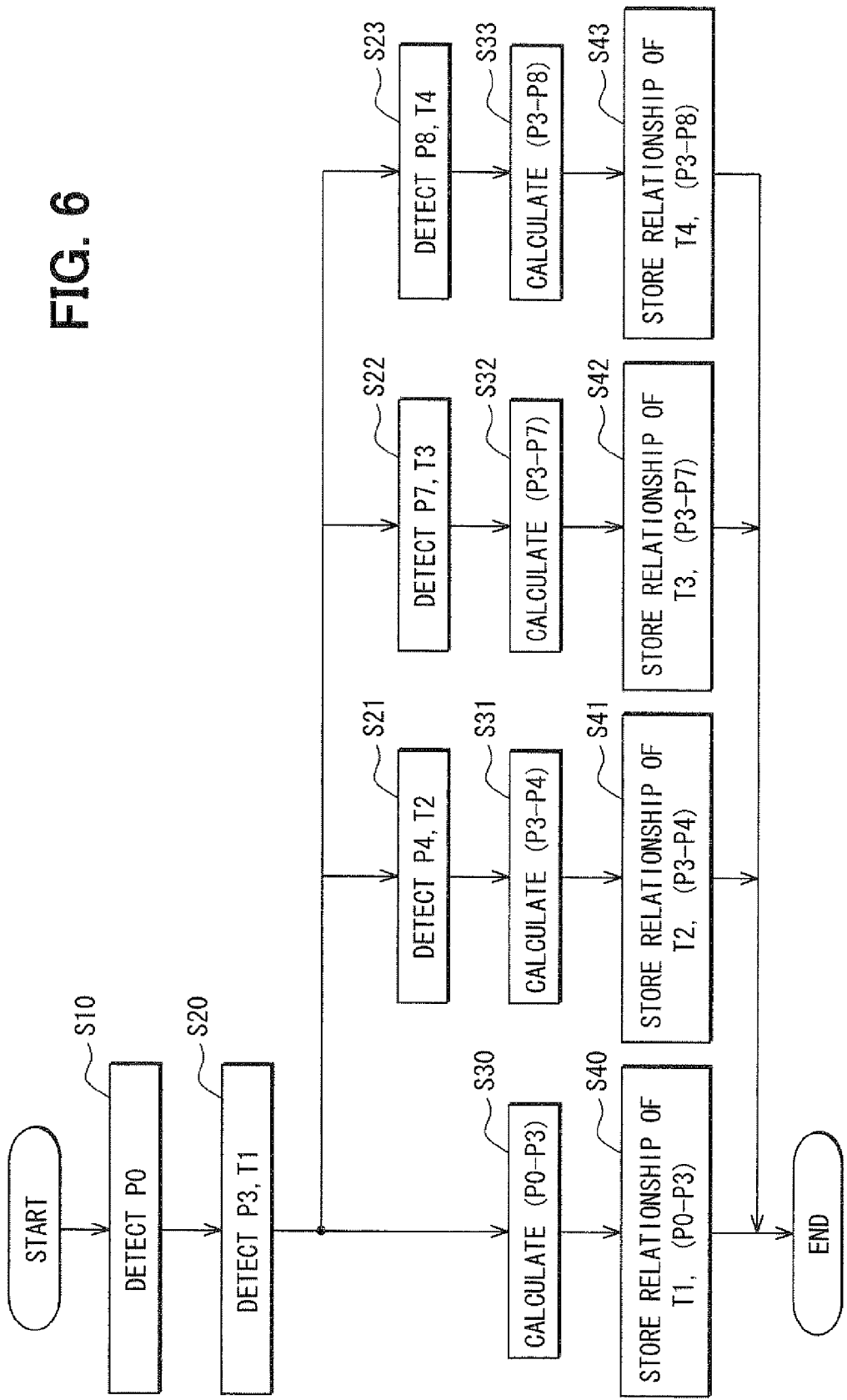
FIG. 6 is a flowchart showing a procedure of a calculation process for individual difference information and a writing process to an IC memory.
Figure 7:
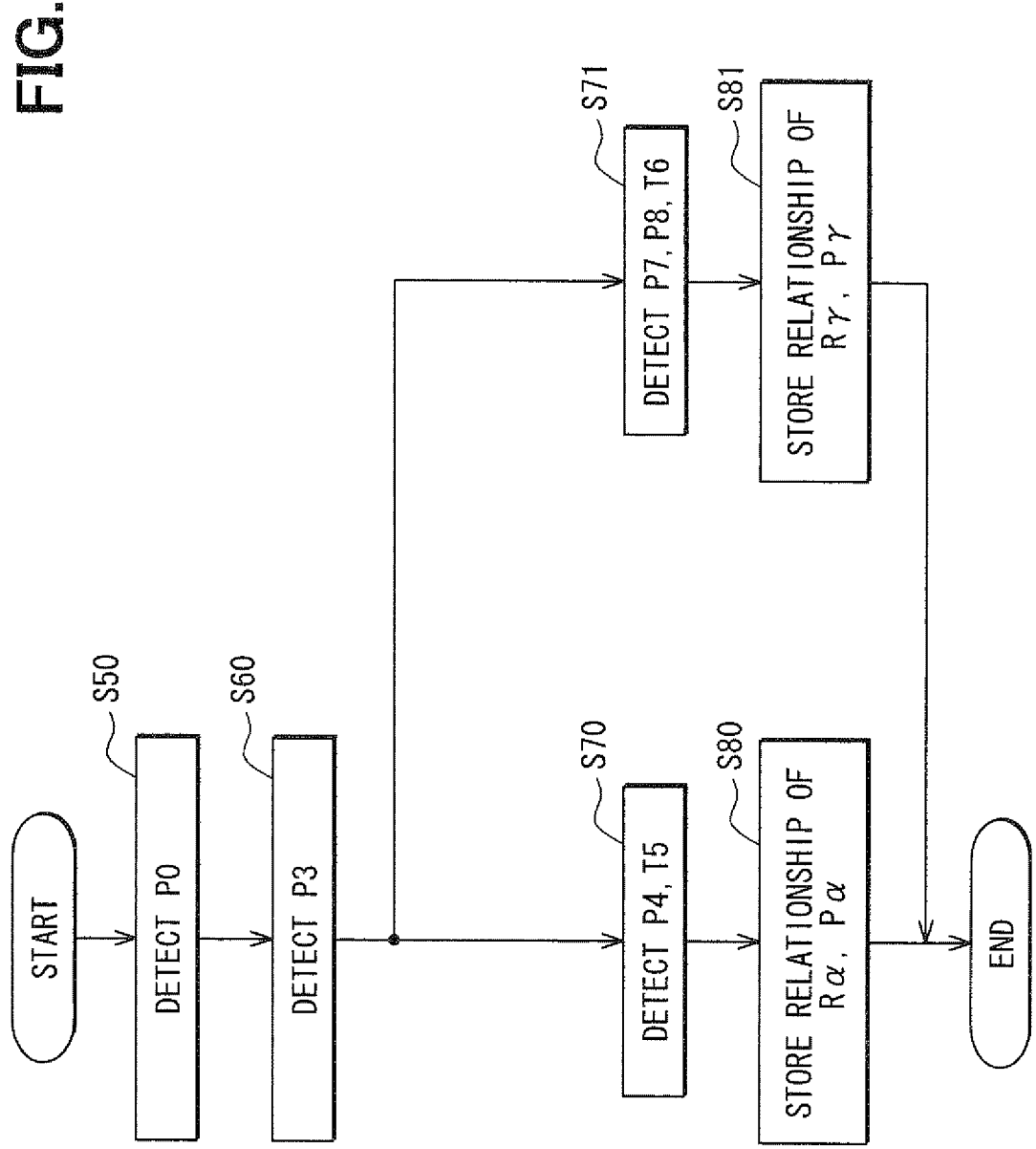
FIG. 7 is a flowchart showing a procedure of a calculation process for individual difference information and a writing process to an IC memory.

Next, the individual difference information A1 to A7 is described in detail. In addition, the procedure of the generation process of the individual difference information A1 to A7 and the writing process to the IC memory 26 are described with reference to FIGS. 6, 7. In the present embodiment, the calculation process and the writing process respectively shown in FIGS. 6, 7 are performed by a measurement operator using the measuring instrument 53. Alternatively, the measuring instrument 53 may automatically perform the series of processes, which are equivalent to those shown in FIGS. 6, 7.

The pressure sensor 20a is mounted to the injector 20. In the present structure, the pressure sensor 20a is located at the downstream of the common rail 12 with respect to the fuel flow in the fuel passage, which extends from the common rail 12 to the nozzle holes 20f. That is, the pressure sensor 20a is located close to the nozzle holes 20f in the fuel passage. Therefore, fluctuation, which is caused by the change in injection rate, can be obtained as information from the waveform of the detected pressure of the pressure sensor 20a. Here, the fluctuation, which is caused by the change in injection rate, may not be obtained in a structure where the pressure sensor 20a is located in the common rail 12. In addition, such a fluctuation in detected pressure has a high correlation with the change in injection rate, as indicated by the examination result in FIG. 5. Therefore, the change in actual injection rate can be estimated from the fluctuation in the waveform of the detected pressure, based on the present correlation.

The individual difference information A1 to A7 is defined by noting acquisition of the correlation between such a change in injection rate and fluctuation in detected pressure. Specifically, the individual difference information A1 to A7 represents a relationship between the change in injection rate (injection state) in the period between the transition points R3, R8 when the injector 20 injects fuel and the fluctuation in detected pressure of the pressure sensor 20a in the range between the transition points P1, P8, the fluctuation being attributed to the fuel injection.

In the process in FIG. 6, the detected pressure P0 at the energization start time point Is is first obtained at S10. At the energization start time point Is, energization of the solenoid 20b is started. Next, the detected pressure at the transition point P3, which is attributed to the actual injection start R3, is obtained at S20. In addition, the lapsed time T1 (first period) from the time point R3 (first reference point), in which the actual injection start is started, to the time point of the transition point P3 is measured at S20. Next, at S30, pressure difference P0-P3 is calculated as decrease in detected pressure caused by leakage in the time period from the energization start time point Is to the actual injection starts. Next, the relationship between the lapsed time T1 and the pressure difference P0-P3 is defined as individual difference information A1, and the individual difference information A1 is stored in the IC memory 26 at S40.

The individual difference information A2 to A4 is also stored in the IC memory 26 by a similar procedure at S21 to S41, S22 to S42, and S23 to S43. Specifically, pressure at the transition points P4, P7, P8, which are respectively attributed to the R4 (maximum injection rate reach), the R7 (injection rate decrease start), and the R8 (actual injection end), is obtained at S21 to S23. In addition, the lapsed time T2 (second period), T3 (third period), and T4 (fourth period) are measured at S21 to S23. The lapsed time T2, T3, T4 are respectively time periods from the actual injection start R3 (second, third, fourth reference point) to the transition points P4, P7, P8.

Next, at S31, pressure difference P3-P4 is calculated as decrease in detected pressure caused by leakage and fuel injection in the time period from the energization start time point Is to the transition point R4 where injection rate reaches the maximum injection rate. Next, at S32, pressure difference P3-P7 is calculated as decrease in detected pressure caused in the time period from the energization start time point Is to the transition point R7 where the injection rate starts decreasing. Next, at S33, pressure difference P3-P8 is calculated as change in detected pressure caused in the time period from the energization start time point Is to the transition point R8 where the actual injection ends. Each of the pressure difference P0-P3, P3-P4, and P3-P7 is represented by a positive value indicating pressure decrease (pressure drop). The pressure difference P3-P8 is represented by a negative value indicating pressure increase.

The relationship between the lapsed time T2 and the pressure difference P3-P4 is defined as the individual difference information A2 at S41. The relationship between the lapsed time T3 and the pressure difference P3-P7 is defined as the individual difference information A3 at S42. The relationship between the lapsed time T4 and the pressure difference P3-P8 is defined as the individual difference information A4 at S43. The individual difference information A2 to A4 is stored in the IC memory 26 at S41, S42, S43. Thus, the process before the factory shipment of the injector 20 in FIG. 6 ends.

In the process in FIG. 7, the detected pressure P0 at the time point Is is first obtained at S50. At the energization start time point Is, energization of the solenoid 20b is started. Next, the detected pressure at the transition point P3, which is attributed to the actual injection start R3, is obtained at S60. Next, the detected pressure at the transition point P4, which is attributed to the maximum injection rate reach R4, is obtained at 870. In addition, the lapsed time T5 (injection rate increase period) from the transition point P3, which is attributed to the actual injection start R3, to the transition point P4 is measured at S70. Next, pressure decrease rate Pα (Pα=(P3−P4)/T5) is calculated based on the detected pressure at the transition points P3, P4 and the period T5. Next, the relationship between the increase rate Rα in injection rate and the pressure decrease rate Pα is defined as the individual difference information A5, and the individual difference information A5 is stored in the IC memory 26 at S80.

The individual difference information A6 is also stored in the IC memory 26 by a similar procedure at S71, S81. Specifically, the detected pressure at the transition points P7, P8, which are attributed to the injection rate decrease start R7 and the actual injection end R8, is obtained at S71. In addition, the lapsed time T6 (injection rate decrease period) from the transition point P7 (sixth reference point), which is attributed to the injection rate decrease start R7, to the transition point P8 is measured at S71. Next, pressure increase rate Pλ (Pλ=(P7−P8)/T6) is calculated based on the detected pressure at the transition points P7, P8 and the period T6. Next, the relationship between the decrease rate Rλ in injection rate and the pressure increase rate Pλ is defined as the individual difference information A6, and the individual difference information A6 is stored in the IC memory 26 at S81.

Furthermore, detected pressure decrease Pβ caused in the time period (fifth period) T5 is calculated. The fifth period T5 is a time period from the time (fifth reference time) of the transition point P3, which is attributed to actual injection start R3, until the transition point P4, which is attributed to the maximum injection rate reach R4. The detected pressure decrease Pβ is the same as the pressure difference P3-P4. Therefore, the pressure difference P3-P4, which is calculated in the process at S41 in FIG. 6, may be used as the detected pressure decrease Pβ. The relationship between the calculated detected pressure decrease Pβ and the calculated maximum injection rate Rβ is defined as the individual difference information A7, and the individual difference information A7 is stored in the IC memory 26.

<Individual Difference Information B1, B2>

Next, the individual difference information B1, B2 is described in detail. The calculation process of the individual difference information B1, B2 and the writing process to the IC memory 26 are performed using the measuring instrument 53, similarly to the individual difference information A1 to A7.

The pressure sensor 20a is mounted to the injector 20. In the present structure, the pressure sensor 20a is located at the downstream of the common rail 12 with respect to the fuel flow in the fuel passage, which extends from the common rail 12 to the nozzle holes 20f. That is, the pressure sensor 20a is located close to the nozzle holes 20f in the fuel passage. Therefore, fluctuation, which is caused by the change in injection rate, can be obtained as information from the waveform of the detected pressure of the pressure sensor 20a. Here, the fluctuation, which is caused by the change in injection rate, may not be obtained in a structure where the pressure sensor 20a is located in the common rail 12.

As indicated by the examination result in FIG. 5, response delay (injection response time delay) T1 arises in the detection of the pressure fluctuation, which is caused in the nozzle holes 20f, using the pressure sensor 20a. The injection response time delay T1 is the time period from the pressure fluctuation arises in the nozzle holes 20f to the pressure fluctuation is transmitted to the pressure sensor 20a. Similarly, response delay (leak response time delay) Ta arises from the time point where fuel starts leaking from the leak hole 24 to the time point where fluctuation in detected pressure of the pressure sensor 20a is caused by the start of the fuel leakage.

Even in the same type of the injectors 20, individual difference is caused in the injection response time delay T1 and the leak response time delay Ta. The individual difference is attributed to the location of the pressure sensor 20a. Specifically, the individual difference is attributed to the fuel passage length La (FIG. 2) from the nozzle holes 20f to the pressure sensor 20a, the fuel passage length Lb (FIG. 2) from the leak hole 24 to the pressure sensor 20a, the passage cross-sectional area thereof, and the like. Therefore, when the creating of the injection control map and the fuel injection control are performed based on at least one of the injection response time delay T1 and the leak response time delay Ta, the accuracy of the injection control can be enhanced.

The individual difference information B1, B2 is defined by noting acquisition of such an injection response time delay T1 and such a leak response time delay Ta. Specifically, the individual difference information B1 represents the injection response time delay T1 from the time point R3, in which the actual injection is started, to the transition point P3, which is attributed to the actual injection start R3. The injection response time delay T1 is the same as the lapsed time T1 (first period). Therefore, the lapsed time T1, which is calculated in the process at S20 in FIG. 6, may be used as the injection response time delay T1.

The individual difference information B2 represents the leak response time delay Ta from the energization start time point Is, in which energization to the solenoid 20b is started, to the transition point P1, which is attributed to the start of fuel leak from the leak hole 24. In the present embodiment, it is regarded that the energization start time point Is, in which energization of the solenoid 20b is started, is the same as the time point in which fuel leak actually starts. Thus, the injection response time delay T1 and the leak response time delay Ta, which are calculated in this way, are respectively defined as the individual difference information B1, B2, and the individual difference information B1, B2 are stored in the IC memory 26.

Instead of detecting the injection response time delay T1 in the process at S20 in this way, the injection response time delay T1 may be calculated in the following manner. Specifically, the bulk modulus of elasticity K, which will be describe below, and the fuel passage length La, Lb may be measured. Subsequently, the injection response time delay T1 may be calculated from the bulk modulus of elasticity K and the fuel passage length La. And subsequently, the leak response time delay Ta may be calculated from the bulk modulus of elasticity K and the fuel passage length Lb.

The bulk modulus of elasticity K is equivalent to the bulk modulus of elasticity of fuel in the entire of the fuel path, which extends from an outlet port 11e of the high-pressure pump 11a to the nozzle hole 20f of each of the injectors 20(#11) to 20(#4). The bulk modulus of elasticity K satisfies the formula $\Delta P = K \cdot \Delta V/V$, wherein $\Delta P$: change in pressure accompanied with change in volume of fluid, V: volume, and $\Delta V$: change in volume from the volume V, in pressure change caused in specific fluid. The inverse number of the coefficient K is equivalent to the compression ratio.

As follows, one example of calculation of the injection response time delay T1 based on the passage length La and the bulk modulus of elasticity K is described.

The injection response time delay T1 can be defined by the formula of $T1 = La/v$, wherein the flow velocity of fuel is v. The flow velocity v can be calculated based on the bulk modulus of elasticity K. Similarly, the leak response time delay Ta can be defined by the formula of $Ta = Lb/v$. The flow velocity v can be calculated based on the bulk modulus of elasticity K.

Thus, the injection response time delay T1 and the leak response time delay Ta can be calculated by using the bulk modulus of elasticity K and the fuel passage length La, Lb as parameters in this way. Therefore, the parameters K, La, and Lb may be defined as the individual difference information B1, B2 instead of the injection response time delay T1 and the leak response time delay Ta, and the parameters K, La, and Lb may be stored in the IC memory 26.

<Individual Difference Information C1 to C3>

Next, the individual difference information C1 to C3 is described in detail with reference to FIGS. 8 to 12. The calculation process of the individual difference information C1 to C3 and the writing process to the IC memory 26 are performed using the measuring instrument 53, similarly to the individual difference information A1 to A7. FIG. 8 shows an examination result, which is obtained similarly to the examination result in FIG. 5. In each of FIGS. 9 to 12, the upper timing chart shows the instruction signal as the driving current with respect to the injector 20, and the lower timing chart shows a waveform indicating the fluctuation in detected pressure attributed to the instruction signal.

Here, to perform a multi-stage injection control so as to conduct multiple fuel injection within one burning cycle, it is necessary to care about the following subject. As enclosed by the dashed dotted line Pe in FIG. 8, the fluctuation pattern of the former-stage injection and the fluctuation pattern of the latter-stage injection are partially overlapped one another to cause interference. Specifically, the fluctuation pattern of the fluctuation waveform, which corresponds to the n-th injection, is overlapped with the end portion of the fluctuation waveform, which is accompanied with the m-th injection after the end of the injection. The n-th injection is subsequent to the first injection. The m-th injection is in advance of the n-th injection. In the present embodiment, the m-th injection is the first injection. Hereafter, the fluctuation pattern is referred to a post-injection fluctuation pattern Pe.

Figure 9:
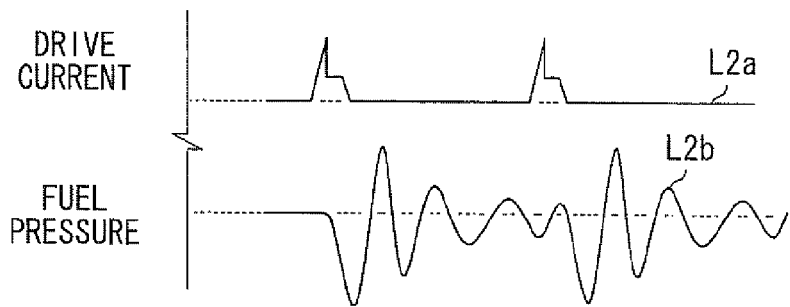
FIG. 9 is a timing chart showing the injection characteristic according to the embodiment.

In further detail, when injection is performed twice as shown in FIG. 9, the fluctuation waveform shown by the solid line L2b is generated with respect to the energization pulse shown by the solid line L2a in FIG. 9. As for the two injections indicated in FIG. 23, the fluctuation pattern, which is attributed only to the latter-stage injection, and the fluctuation pattern of the former-stage injection at the former-stage side interfere with each other in the vicinity of the start timing of the latter-stage injection. Accordingly, it is difficult to recognize the fluctuation pattern, which is attributed only to the latter-stage injection.

Figure 10:
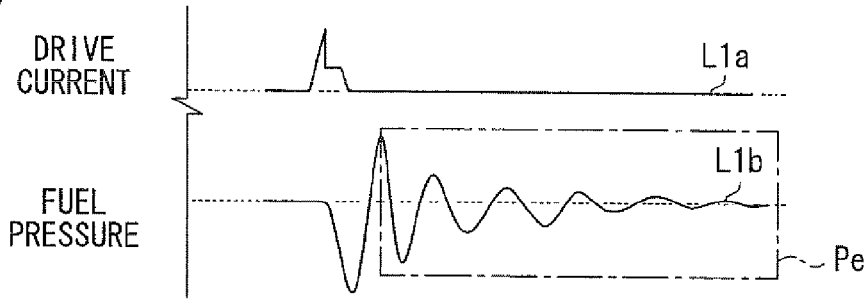
FIG. 10 is a timing chart showing the injection characteristic according to the embodiment.
Figure 11:
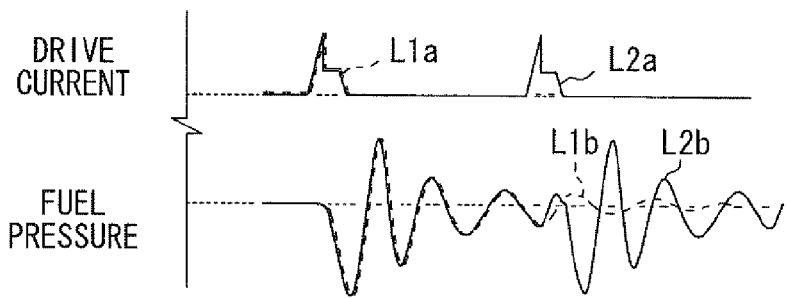
FIG. 11 is a timing chart showing the injection characteristic according to the embodiment.
Figure 12:
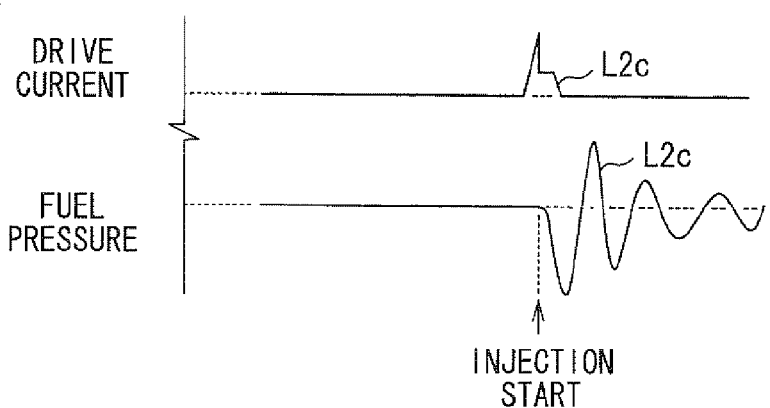
FIG. 12 is a timing chart showing the injection characteristic according to the embodiment.

As shown in FIG. 10, when only the former-stage injection is performed, the fluctuation waveform shown by the solid line L1b is generated with respect to the energization pulse shown by the solid line L1a in FIG. 10. FIG. 11 shows the solid lines L2a, L2b, which respectively depict the fluctuation waveforms in FIG. 9, and the dashed lines L1a, L1b, which respectively depict the fluctuation waveforms in FIG. 10. As shown in FIG. 12, the fluctuation pattern shown by the solid line L2c, which is attributed only to the latter-stage injection, can be extracted by subtracting the fluctuation waveform L1b in FIG. 10 from the corresponding portion of the fluctuation waveform L2b in FIG. 9.

The individual difference information C1 to C3 is needed for extracting the fluctuation pattern L2c, which is attributed only to the latter-stage injection. That is, the individual difference information C1 to C3 is related to the post-injection fluctuation pattern Pe (FIG. 8), which is included in the fluctuation waveform of the detected pressure of the pressure sensor 20a, the fluctuation waveform being accompanied with one fuel injection. Referring to FIG. 8, the individual difference information C1 represents the amplitude S of the post-injection fluctuation pattern Pe, and the individual difference information C2 represents the cycle T7 of the post-injection fluctuation pattern Pe.

The individual difference information C3 represents a partial fluctuation pattern Py, which is shown by the solid line in FIG. 8. The partial fluctuation pattern Py appears at a cycle shorter than the cycle of a calculated waveform Px shown by the dotted line in FIG. 8. The calculated waveform Px is calculated from the amplitude S and the cycle T7 of the post-injection fluctuation pattern Pe. For example, the individual difference information C3 may be obtained by subtracting each portion of the fluctuation pattern Py from each corresponding portion of the calculated waveform Px. Alternatively, information, which is related to attenuation such as an attenuation factor of the post-injection fluctuation pattern Pe, may be used as the individual difference information.

Preferably, in a case where a value included in each individual difference information A1 to A7, B1, B2, C1 to C3 exceed a predetermined upper limit, it is determined that a malfunction is caused. Specifically, for example, the measuring instrument 53 or the like may determine a malfunction to be caused in a case where the amplitude S and the cycle T7 of the post-injection fluctuation pattern Pe exceed the upper limit thereof.

As described above, this embodiment produces the following preferable effects.

(1) The information related to the post-injection fluctuation pattern Pe as the individual difference information C1 to C3 is stored in the IC memory 26. Therefore, the individual difference information B1, B2 can be reflected on the injection control map, and the injection control can be performed in accordance with the present injection control map. Therefore, according to the present embodiment, the injection state of the injector 20 can be controlled with high accuracy, compared with a conventional device, which stores the Tq-Q characteristic as individual difference information and performs an injection control using the pre-stored Tq-Q characteristic.

(2) The individual difference information A1 to A7 is stored in the IC memory 26. The individual difference information A1 to A7 represents the relationship between the change in injection rate (injection state) in the period between the actual injection start R3 and the actual injection end R8 and the fluctuation in detected pressure of the pressure sensor 20a in the range between the transition points P1, P8, the fluctuation being attributed the fuel injection. In the present structure, the individual difference information A1 to A7 can be reflected on the injection control map, and the injection control can be performed in accordance with the present injection control map. Therefore, the injection state of the injector 20 can be controlled with high accuracy.

(3) The injection response time delay T1 and the leak response time delay Ta as the individual difference information B1, B2 are stored in the IC memory 26. In the present structure, the individual difference information C1 to C3 can be reflected on the injection control map, and the injection control can be performed in accordance with the present injection control map. Therefore, the injection state of the injector 20 can be controlled with high accuracy.

(4) In the examination for obtaining the individual difference information, the injector 20 is combined with the corresponding pressure sensor 20a in the state where multiple injectors 20(#1) to 20(#4) are mounted to the engine. Specifically, for example, the injector of 20(#1) is combined with the pressure sensor 20a of the cylinder (#1) in the present examination. Therefore, the detection characteristic of the pressure sensor 20a, which is used in an actual engine operation, is reflected on the individual difference information A1 to A7. Thus, the injection state of the fuel injection valve can be controlled with high accuracy.

(5) The pressure sensor 20a is mounted to the injector 20. Therefore, the pressure sensor 20a, which is used in the injection characteristic examination before the factory shipment, can be restricted from being mounted to an injector 20, which is other than the corresponding injector 20. Specifically, for example, the pressure sensor 20a, which corresponds to the injector 20(#1) can be restricted from being mounted to one of the injector 20(#2) to 20(#4). Thus, an erroneous assembly can be restricted. In addition, in the present structure, the location of the pressure sensor 20a is closer to the nozzle holes 20f, compared with the structure in which the pressure sensor 20a is mounted to the high-pressure pipe 14, which connects the common rail 12 with the injector 20. Therefore, the pressure fluctuation at the nozzle holes 20f can be further accurately detected, compared with a structure in which the pressure fluctuation, which has been attenuated through the high-pressure pipe 14, is detected.

Other Embodiments

The present invention is not limited to the above embodiment. The features of the embodiment may be arbitrarily combined.

In addition to the decrease and increase in detected pressure, the variations with respect to the change in decrease and increase in detected pressure may be stored in the IC memory 26 as the individual difference information A8. Specifically, for example, when the examination in FIG. 5 is conducted for multiple times under the same condition, variation may be caused in the obtained result of the fluctuation waveform of the detected pressure. For example, such a variation may be combined with the individual difference information A1 to A7 and may be stored.

The start point of the post-injection fluctuation pattern Pe may be stored in the IC memory 26 as the individual difference information C4, which is related to the post-injection fluctuation pattern Pe, together with the individual difference information C1 to C3. Preferably, the start point is the transition point P8, which is attributed to the actual injection end, in the fluctuation waveform of the detected pressure of the pressure sensor 20a, the fluctuation waveform being accompanied with one fuel injection.

In the above embodiment, the first to fourth reference point is defined as the actual injection start point R3. Alternatively, the actual injection start point R3 may be defined as another time point. The fifth and sixth reference point may be also defined as another time point dissimilarly to the above embodiment. In the above embodiment, the period from the transition point P7 to the transition point P8 is defined as the injection rate decrease period T6, and the pressure increase rate Pλ is calculated based on the pressure increase in the injection rate decrease period T6. Alternatively, another period, which is included in the period between the transition points P7 to P8 may be defined as the injection rate decrease period, and the pressure increase rate Pλ may be calculated based on the pressure increase in the present injection rate decrease period. Similarly, another period, which is included between the transition points P3 to P4, may be defined as the injection rate increase period, and the pressure decrease rate Pα may be calculated based on the pressure decrease in the injection rate increase period.

In the embodiment, the IC memory 26 is employed as the storage unit (memory unit) for storing the individual difference information. Alternatively, another memory storage such as a device using the QR code (registered trademark), may be employed as the storage unit.

In the above embodiment, the IC memory 26 as the storage unit is mounted to the injector 20. Alternatively, the IC memory 26 may be mounted to a component other than the injector 20. Preferably, at the time of the factory shipment of the injector 20, the injector 20 is integrally mounted with the storage unit.

The injector 20 may be provided with a piezo actuator, instead of the solenoid actuator shown in FIG. 2. A direct-acting injector may be also used. The direct-acting injector is operated without pressure leak from the leak hole 24 or the like, and a hydraulic pressure chamber Cd is not used to transmit driving power. The direct-acting injector may be a direct-acting piezo injector developed in recent years, for example. When the direct-acting injector is employed, the injection rate can be easily controlled.

In the above embodiment, the pressure sensor 20a is mounted to the fuel inlet hole 22 of the injector 20. Alternatively, as shown by the dashed dotted line 200a in FIG. 2, a pressure sensor 200a may be mounted to the inside of the housing 20e, and fuel pressure in the fuel passage 25, which extends from the fuel inlet hole 22 to the nozzle holes 20f, may be detected.

Further in the case where the fuel inlet hole 22 is mounted with the pressure sensor as described above, the mounting structure of the pressure sensor 20a can be simplified, compared with the structure in which the inside of the housing 20e is mounted with the pressure sensor. On the other hand, in the structure in which the inside of the housing 20e is mounted with the pressure sensor, the location of the pressure sensor 20a is closer to the nozzle holes 20f, compared with the structure in which the fuel inlet hole 22 is mounted with the pressure sensor. Therefore, pressure fluctuation in the nozzle holes 20f can be further properly detected.

The pressure sensor 20a may be mounted to the high-pressure pipe 14. In this case, the pressure sensor 20a is preferably mounted to the location at a predetermined distance from the common rail 12.

A flow regulating unit may be provided to a connection between the common rail 12 and the high-pressure pipe 14 for regulating fuel flow from the common rail 12 to the high-pressure pipe 14. The present flow regulating unit is configured to blockade the passage when excessive fuel outflow is caused by, for example, fuel leak due to damage in the high-pressure pipe 14, the injector 20; or the like. For example, the flow regulating unit may be a valve element such as a ball element, which is configured to blockade the passage in the case of excessive flow. A flow damper, which is constructed by integrating the orifice 12a with the flow regulating unit, may be employed.

According to the above embodiment, in the examination shown in FIG. 4, pressure being changed by test-injected fuel, is detected using the strain gauge 51. Alternatively, a pressure sensor, which is provided in the vessel 50, may be used for detecting the pressure, instead of the strain gauge 51. In the examination shown in FIG. 4, the change in injection rate of fuel may be estimated from the change in detection result (detected pressure) of the pressure sensor 20a. Further, the estimation result may be compared with the actual change in injection rate, which is obtained by using the strain gauge 51 or the pressure sensor for the examination. In this case, the deviation between the estimation result and the actual change may be reflected on the creation of the individual difference information A1 to A7, B1, B2, C1 to C3.

The pressure sensor 20a may be located downstream of the orifice and the flow regulating unit with respect to the fuel flow. Alternatively, the pressure sensor 20a may be located downstream of at least one of the orifices and the flow regulating unit.

The number of the fuel pressure sensor 20 may be arbitrary determined For example, two or more sensors may be provided to a fuel passage for one cylinder. In the above embodiment, the pressure sensor 20a is provided to each cylinder. Alternatively, the pressure sensor 20a may be provided to only a part of the cylinders. For example, the pressure sensor 20a may be provided to only one cylinder. In this case, fuel pressure for other cylinders may be estimated based on the sensor output of the pressure sensor 20a.

In the obtaining of the sensor output of the pressure sensor 20a by using the measuring instrument 53 in the examination or by using the ECU 30 in an operation of the internal combustion engine at the time of injection control, the sensor output is preferably obtained at an interval such as 20 microseconds for recognizing the tendency of the pressure fluctuation. In this case, the interval is preferably shorter than 50 microseconds.

It is also effective to additionally provide a rail pressure sensor for detecting pressure in the common rail 12, in addition to the pressure sensor 20a. In the present structure, the rail pressure in the common rail 12 can be further obtained, in addition to the pressure detected by the pressure sensor 20a. Thus, the fuel pressure can be detected at higher accuracy.

The type of the engine and the system configuration as the controlled object may be also arbitrary changed according to the application or the like. According to the embodiment, the device and system are applied to the diesel engine as one example. Alternatively, the device and system are applicable to a spark ignition gasoline engine, in particular a direct-injection engine, for example. In a fuel injection system for a direct fuel-injection gasoline engine, a delivery pipe is provided for storing gasoline at high-pressure. In this case, high-pressure fuel is fed from the fuel pump to the delivery pipe, and the high-pressure fuel is distributed from the delivery pipe to the multiple injectors 20 and injected into the combustion chambers of the engine. In such a system, the delivery pipe is equivalent to the pressure-accumulation vessel. The device and system are not limited to be used for the control of a fuel injection valve, which injects fuel directly in a cylinder. The device and system may be used for a fuel injection valve, which injects fuel to an engine intake passage or an exhaust passage.

As described above, according the embodiment, the individual difference information is related to the fluctuation pattern (Pe) of the portion of the fluctuation in detected pressure waveform of the pressure sensor (20a), the fluctuation being attributed to one fuel injection through the nozzle hole (20f), and the portion of the fluctuation is subsequent to an end of the fuel injection.

Pressure of fuel in the nozzle hole of the fuel injection valve is changed through the injection of fuel. In such a nozzle hole, pressure fluctuation has a high correlation with the injection state such as the actual injection start point, the maximum injection rate reach point, and the like. The inventor noted the present subject and conducted a study to specifically detect the injection state other than the injection quantity Q by detecting the pressure fluctuation. However, in the device according to JP-A-2006-200378, the pressure sensor as the rail pressure sensor is located at the pressure-accumulation vessel for detecting pressure of fuel in the pressure-accumulation vessel. Accordingly, the pressure fluctuation attributed to the injection may be attenuated within the pressure-accumulation vessel. Therefore, it is difficult to detect the pressure fluctuation with sufficient accuracy in such a conventional device.

According to the above embodiment, the pressure sensor is located in the fuel passage, which extends from the pressure-accumulation vessel to the nozzle hole of the fuel injection valve. The pressure sensor is located closer to the nozzle hole than the pressure-accumulation vessel. Therefore, the pressure sensor is capable of detecting pressure in the nozzle hole, before the pressure is attenuated in the pressure-accumulation vessel. Therefore, the pressure fluctuation attributed to the injection can be detected with sufficient accuracy. Thus, the injection state can be specifically detected based on the detection result. In the present structure, the injection state of the fuel injection valve can be specifically controlled with high accuracy.

Here, in the case where a fuel injection valve, which is shipped from a factory and mounted to an internal combustion engine, conducts the multi-stage injection control for performing multiple fuel injections within one burning cycle of the internal combustion engine, the following subjects need to be considered so as to specifically control the fuel injection in accordance with the detection result of the fluctuation waveform indicating pressure fluctuation. The fluctuation pattern of the former-stage injection and the fluctuation pattern of the latter-stage injection are partially overlapped one another and cause interference. Specifically, the fluctuation pattern of the fluctuation waveform, which corresponds to the n-th injection, is overlapped with the end portion of the fluctuation waveform, which is attributed to the m-th injection after the end of the injection. The n-th injection is subsequent to the first injection. The m-th injection is in advance of the n-th injection. Therefore, in the multi-stage injection control, it is difficult to specifically control the injection state of the n-th injection with high accuracy simply in accordance with the detection result as the fluctuation waveform of pressure fluctuation.

In the embodiment, the individual difference information, which is stored in the storage unit, is related to the fluctuation pattern of the portion of the fluctuation in detected pressure waveform of the pressure sensor the fluctuation being attributed to one fuel injection through the nozzle hole, and the portion of the fluctuation being subsequent to the end of the fuel injection. For example, the fluctuation pattern of the portion after the end of the fuel injection is examined through an examination of the injection characteristic of the fuel injection valve before factory shipments thereof. Subsequently, the fluctuation pattern obtained by the examination is stored as the individual difference information in the storage unit. Thus, for example, the fluctuation waveform attributed only to the n-th injection can be extracted by subtracting the fluctuation pattern of the portion after the end of the m-th injection from the fluctuation pattern of the portion corresponding to the n-th injection of the fluctuation waveform of the pressure sensor (FIGS. 9 to 12). The fluctuation pattern of the portion corresponding to the n-th injection includes the fluctuation waveform attributed only to the n-th injection and the fluctuation pattern of the portion after the end of the m-th injection, which overlap one another. In the present structure, the injection state of the fuel injection valve can be specifically controlled with high accuracy by using the extracted waveform.

Here, the detection characteristic of the pressure sensor also has an individual difference. Specifically, even in the same type of the pressure sensor, the output voltage with respect to the same pressure may differ. Therefore, in the examination before the factory shipment, when the examination is conducted using a different pressure sensor from the pressure sensor which is actually mounted to the fuel injection device, the detection characteristic of the pressure sensor, which is used in the actual operation of the internal combustion engine, may not be reflected on the individual difference information. In view of the foregoing, according to the present aspect, the individual difference information relates to the portion of the fluctuation pattern, which is subsequent to the end of fuel injection of the fluctuation waveform of the detection pressure of the pressure sensor. That is, the examination for a combination of the detected pressure of the pressure sensor and the fuel injection valve of the fuel injection device is conducted, and the individual difference information, which is obtained as a result of the examination, is used. Therefore, the detection characteristic of the pressure sensor, which is used in an actual engine operation, is reflected on the individual difference information. Thus, the injection state of the fuel injection valve can be controlled with high accuracy.

According to the embodiment, the individual difference information is related to, for example, at least one of an amplitude (S) of the fluctuation pattern (Pe) and a cycle (T7) of the fluctuation pattern (Pe). The individual difference information is related to, for example, a partial fluctuation pattern (Py), which appears at a partial-fluctuation cycle. The partial-fluctuation cycle is shorter than a calculated-waveform cycle of a calculated waveform (Px), which is calculated from an amplitude (S) of the fluctuation pattern (Pe) and a cycle (T7) of the fluctuation pattern (Pe).

According to the embodiment, the individual difference information is related to, for example, a start point (P8) of the fluctuation pattern (Pe) of the portion of the fluctuation in detected pressure waveform of the pressure sensor (20a). According to the embodiment, the start point (P8) is preferably a time point at which the fluctuation pattern (Pe) of the portion of the fluctuation in detected pressure waveform of the pressure sensor (20a) appears.

According to the embodiment, the individual difference information includes multiple information items, which is respectively obtained by conducting multiple examinations. The multiple examinations respectively include multiple patterns of examination conditions, which are different from each other in pressure of fuel supplied to the fuel injection valve (20). Each of the information items is correlated to each of the multiple patterns and stored. In the present structure, even in the case where the individual difference information, which is related to the fluctuation pattern of the portion of the fluctuation in detected pressure waveform, is changed in dependence upon the supply pressure of fuel to the fuel injection valve, the injection state can be controlled based on the individual difference information according to the supply pressure. Therefore, the injection state can be controlled with high accuracy.

According to the embodiment, the fuel injection device further includes an obtaining unit for obtaining the fluctuation waveform of the detection pressure of the pressure sensor (20a) in the multi-stage injection control, which conducts multiple fuel injections within one burning cycle. The fuel injection device further includes an extracting unit for extracting the fluctuation waveform (L2c) attributed to the n-th injection, which is subsequent to the m-th injection. The extracting unit is configured to extract the fluctuation waveform (L2c) by comparing a first fluctuation pattern (L2b) with a second fluctuation pattern (L1b). The first fluctuation pattern (L2b) is a portion of the fluctuation waveform, which is obtained by the obtaining unit, and corresponds to the n-th injection. The second fluctuation pattern (L1b) is a portion of a fluctuation waveform, which is obtained from information stored by the storage unit (26) and subsequent to an end of the m-th injection. The fuel injection device further includes a control unit for controlling the fuel injection valve (20) by using the fluctuation waveform, which is attributed to the n-th injection and extracted by the extracting unit. The obtaining unit and the extracting unit may be the measuring instrument 53. The control unit may be the ECU 30.

In the present structure, the fluctuation waveform, which is attributed to the n-th injection, is extracted by comparing the fluctuation pattern of the portion corresponding to the n-th injection with the fluctuation pattern of the portion subsequent to the end of the m-th injection. The operation of a fuel injection valve, which is, for example, shipped from the factory and mounted to the internal combustion engine, is controlled using the extracted fluctuation waveform, which is attributed to the n-th injection. In the present structure, the injection state of the fuel injection valve can be specifically controlled with high accuracy.

According to the embodiment, the fuel injection device further includes a malfunction determining unit for determining that a malfunction occurs when a value related to the fluctuation pattern of the portion, which is subsequent to the end of the fuel injection and stored in the storage unit, becomes greater than a predetermined upper limit. Therefore, in a condition where it is determined that a malfunction occurs, for example, an operation such as a control of an injection state can be performed adaptively to the malfunction, without using the individual difference information or the like. Therefore, robustness of the pressure sensor can be enhanced. The malfunction determining unit may be the measuring instrument 53. The value may be at least one of the amplitude (S) of the fluctuation pattern (Pe) and the cycle (T7) of the fluctuation pattern (Pe).

Here, according to the embodiment, the individual difference information obtained as a result of the examination in which the detected pressure and the fuel injection valve of the pressure sensor, which is mounted to the corresponding fuel injection device, are combined. Therefore, the detection characteristic of the pressure sensor actually used in an actual operation of the internal combustion engine can be reflected on the individual difference information. According to the embodiment, the pressure sensor is mounted to the fuel injection valve. In the present structure, the pressure sensor, which is used in the injection characteristic examination before the factory shipment, can be restricted from being mounted to an injector, which is other than the corresponding injector. Thus, an erroneous assembly can be restricted.

In addition, according to the embodiment, the location of the pressure sensor is closer to the injection hole, compared with the structure in which the pressure sensor is mounted to the high-pressure pipe, which connects the pressure-accumulating vessel with the injector. Therefore, pressure fluctuation at the nozzle holes can be further accurately detected, compared with a structure in which the pressure fluctuation, which has been attenuated through the high-pressure pipe, is detected.

The pressure sensor is mounted to the fuel injection valve. According to the embodiment, the pressure sensor (20a) is located at a fuel inlet hole (22) of the fuel injection valve (20). Alternatively, according to the embodiment, the pressure sensor (20a) is located in the fuel injection valve (20) for detecting pressure of fuel in an inner fuel passage (25), which extends from the fuel inlet hole (22) to the nozzle hole (20f).

Further in the case where the fuel inlet hole is mounted with the pressure sensor as described above, the mounting structure of the pressure sensor can be simplified, compared with the structure in which the inside of the fuel injection valve is mounted with the pressure sensor. On the other hand, in the structure in which the inside of the fuel injection valve is mounted with the pressure sensor, the location of the pressure sensor is closer to the injection holes, compared with the structure in which the fuel inlet hole is mounted with the pressure sensor. Therefore, pressure fluctuation in the injection holes can be further properly detected.

According to the embodiment, an orifice (12a) is located in a fuel passage (25), which extends from the pressure-accumulation vessel (12) to a fuel inlet hole (22) for attenuating fluctuation in pressure of fuel flowing from the pressure-accumulation vessel (12). The pressure sensor (20a) is located downstream of the orifice (12a) with respect to fuel flow. In the case where the pressure sensor is located upstream of the orifice, fluctuation in pressure, which has been attenuated through the orifice, is detected.

By contrast, according to the embodiment, the pressure sensor is located downstream of the orifice. Therefore, pressure fluctuation can be detected before being attenuated through the orifice. Therefore, pressure fluctuation in the nozzle hole can be further properly detected.

According to the embodiment, the storage unit is an integrated circuit memory (IC memory). Therefore, the storage unit can be preferably increased in storage capacity, compared with the QR code (registered trademark).

According to the embodiment, a fuel injection system includes the above fuel injection device. The fuel injection system further includes the pressure-accumulation vessel (12) configured to accumulate fuel at predetermined pressure and distribute the accumulated fuel to multiple fuel injection valves. The fuel injection system is capable of producing the above various effects.

The above structures of the embodiment can be combined as appropriate. The above processings such as calculations and determinations are not limited being executed by the ECU 30. The control unit may have various structures including the ECU 30 shown as an example.

The above processings such as calculations and determinations may be performed by any one or any combinations of software, an electric circuit, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiment of the present invention have been described herein as including a specific sequence of steps, further alternative embodiment including various other sequences of these steps and/or additional steps not disclosed herein are intended to be within the steps of the present invention.

Various modifications and alternations may be diversely made to the above embodiment without departing from the spirit of the present invention.

What is claimed is:

1. A fuel injection device comprising:
a fuel injection valve for injecting fuel, which is distributed from a pressure-accumulation vessel;
a pressure sensor located in a fuel passage, which extends from the pressure-accumulation vessel to a nozzle hole of the fuel injection valve, and configured to detect pressure of the fuel, the pressure sensor being located closer to the nozzle hole than the pressure-accumulation vessel;
a storage unit for storing individual difference information, which indicates an injection characteristic of the fuel injection valve, the injection characteristic being obtained by an examination; and
an extracting unit for extracting a fluctuation waveform using the individual difference information stored in the storage unit,
wherein the individual difference information is related to a fluctuation pattern of a portion of the fluctuation in detected pressure waveform of the pressure sensor, the fluctuation being attributed to one fuel injection through the nozzle hole, and
the portion of the fluctuation is subsequent to an end of the fuel injection.

2. The fuel injection device according to claim 1, wherein the individual difference information is related to at least one of an amplitude of the fluctuation pattern and a cycle of the fluctuation pattern.

3. The ignition coil according to claim 1,
wherein the individual difference information is related to a partial fluctuation pattern, which appears at a partial-fluctuation cycle, and
the partial-fluctuation cycle is shorter than a calculated-waveform cycle of a calculated waveform, which is calculated from an amplitude of the fluctuation pattern and a cycle of the fluctuation pattern.

4. The fuel injection device according to claim 1, wherein the individual difference information is related to a start point of the fluctuation pattern of the portion of the fluctuation in detected pressure waveform of the pressure sensor.

5. The fuel injection device according to claim 4, wherein the start point is a time point at which the fluctuation pattern of the portion of the fluctuation in detected pressure waveform of the pressure sensor appears.

6. The fuel injection device according to claim 1,
wherein the individual difference information includes a plurality of information items, which is respectively obtained by conducting a plurality of examinations,
the plurality of examinations respectively includes a plurality patterns of examination conditions, which are different from each other in pressure of fuel supplied to the fuel injection valve, and
each of the information items is correlated to each of the plurality of patterns and stored.

7. The fuel injection device according to claim 1, further comprising:
an obtaining unit for obtaining a fluctuation waveform of the detection pressure of the pressure sensor in a multi-stage injection control, which conducts a plurality of fuel injections within one burning cycle; and
wherein the extracting unit is configured to extract a fluctuation waveform attributed to an n-th injection, which is subsequent to an m-th injection, by comparing a first fluctuation pattern with a second fluctuation pattern,
the first fluctuation pattern is a portion of the fluctuation waveform, which is obtained by the obtaining unit, and corresponds to the n-th injection, and
the second fluctuation pattern is a portion of a fluctuation waveform, which is obtained from information stored by the storage unit and subsequent to an end of the m-th injection,
the fuel injection device further comprising:
a control unit for controlling the fuel injection valve by using the fluctuation waveform, which is attributed to the n-th injection and extracted by the extracting unit.

8. The fuel injection device according to claim 1, further comprising:
a malfunction determining unit for determining that a malfunction occurs when a value related to the fluctuation pattern of the portion, which is subsequent to the end of the fuel injection and stored in the storage unit, becomes greater than a predetermined upper limit.

9. The fuel injection device according to claim 1, wherein the pressure sensor is provided to the fuel injection valve.

10. The fuel injection device according to claim 9, wherein the pressure sensor is located at a fuel inlet hole of the fuel injection valve.

11. The fuel injection device according to claim 9, wherein the pressure sensor is located in the fuel injection valve and configured to detect pressure of fuel in an inner fuel passage, which extends from the fuel inlet hole to the nozzle hole.

12. The fuel injection device according to claim 1, further comprising:
an orifice located in a fuel passage, which extends from the pressure-accumulation vessel to a fuel inlet hole for attenuating pulsation in pressure of fuel flowing from the pressure-accumulation vessel,
wherein the pressure sensor is located downstream of the orifice with respect to fuel flow.

13. The fuel injection device according to claim 1, wherein the storage unit is an integrated circuit.

14. A fuel injection system comprising:
the fuel injection device according to claim 1; and
the pressure-accumulation vessel configured to accumulate fuel at predetermined pressure and distribute the accumulated fuel to a plurality of fuel injection valves.

15. The fuel injection device according to claim 7, wherein the m-th injection is first injection in the multi-stage injection control.

16. The fuel injection device according to claim 1, further comprising:
an obtaining unit for obtaining a composite fluctuation waveform of the detection pressure in a multi-stage injection including an m-th injection and an n-th injection, which is subsequent to the m-th injection, within one burning cycle,
wherein the fluctuation waveform is attributed to the n-th injection,
the extracting unit is configured to extract the fluctuation waveform by subtracting a fluctuation pattern of a fluctuation waveform, which is obtained from the individual difference information stored in the storage unit and subsequent to an end of the m-th injection, from a fluctuation pattern of a the composite fluctuation waveform obtained by the obtaining unit.

17. A fuel injection device comprising:

a fuel injection valve for injecting fuel distributed from a pressure-accumulation vessel through a fuel passage;

a pressure sensor located in the fuel passage closer to a nozzle hole of the fuel injection valve than the pressure-accumulation vessel for detecting pressure of fuel;

a storage unit for storing individual difference information indicating an injection characteristic of the fuel injection valve obtained by an examination, the individual difference information related to a first fluctuation pattern, which is attributed to a first one fuel injection and subsequent to an end of the first one fuel injection in a first pressure waveform of the detected pressure;

an obtaining unit for obtaining a composite fluctuation waveform caused by the first one fuel injection and a second one fuel injection, which is subsequent to the first one fuel injection, within one burning cycle; and an extracting unit for extracting a second fluctuation waveform, which corresponds to the second one fuel injection, by subtracting a first fluctuation waveform stored in the storage unit from a corresponding portion of the composite fluctuation waveform.

18. A method of controlling a fuel injection device, the method comprising:

injecting fuel using a fuel injection valve which is distributed from a pressure-accumulation vessel;

detecting pressure of the fuel using a pressure sensor located in a fuel passage, which extends from the pressure-accumulation vessel to a nozzle hole of the fuel injection valve, the pressure sensor being located closer to the nozzle hole than the pressure-accumulation vessel;

storing individual difference information, which indicates an injection characteristic of the fuel injection valve, the injection characteristic being obtained by an examination; and extracting a fluctuation waveform using the stored individual difference information; wherein:

the individual difference information is related to a fluctuation pattern of a portion of the fluctuation in detected pressure waveform of the pressure sensor, the fluctuation being attributed to one fuel injection through the nozzle hole, and the portion of the fluctuation is subsequent to an end of the fuel injection.

19. A method of controlling a fuel injection device, the method comprising:

injecting fuel using a fuel injection valve which is distributed from a pressure-accumulation vessel through a fuel passage;

detecting pressure of the fuel using a pressure sensor located in the fuel passage closer to a nozzle hole of the fuel injection valve than the pressure-accumulation vessel;

storing individual difference information indicating an injection characteristic of the fuel injection valve obtained by an examination, the individual difference information related to a first fluctuation pattern, which is attributed to a first fuel injection and subsequent to an end of the first fuel injection in a first pressure waveform of the detected pressure;

obtaining a composite fluctuation waveform caused by the first fuel injection and a second fuel injection, which is subsequent to the first fuel injection, within one burning cycle; and extracting a second fluctuation waveform, which corresponds to the second fuel injection, by subtracting a stored first fluctuation waveform from a corresponding portion of the composite fluctuation waveform.

* * * * *